US008463129B2

(12) United States Patent
Ishida et al.

(10) Patent No.: US 8,463,129 B2
(45) Date of Patent: *Jun. 11, 2013

(54) OPTICAL TRANSMISSION MODULE

(75) Inventors: Yoshihisa Ishida, Otsu (JP); Keisuke Uno, Ikoma (JP); Akira Enami, Ashiya (JP); Katsuhiko Kato, Nara (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 716 days.

This patent is subject to a terminal disclaimer.

(21) Appl. No.: 12/594,775

(22) PCT Filed: Apr. 3, 2008

(86) PCT No.: PCT/JP2008/056668
§ 371 (c)(1),
(2), (4) Date: Oct. 5, 2009

(87) PCT Pub. No.: WO2008/126753
PCT Pub. Date: Oct. 23, 2008

(65) Prior Publication Data
US 2010/0124422 A1    May 20, 2010

(30) Foreign Application Priority Data
Apr. 5, 2007   (JP) ................. 2007-099916

(51) Int. Cl.
*H04B 10/00*   (2006.01)
(52) U.S. Cl.
USPC ............ 398/115; 398/116; 398/38; 398/140; 398/141; 398/164
(58) Field of Classification Search
USPC ............... 398/45, 115–117, 140–142, 182, 398/202
See application file for complete search history.

(56) References Cited

U.S. PATENT DOCUMENTS

| 6,868,214 | B1 * | 3/2005 | Sakata et al. ............ 385/129 |
| 2004/0201510 | A1 | 10/2004 | Tamba |

(Continued)

FOREIGN PATENT DOCUMENTS

| JP | 5-193427 A | 8/1993 |
| JP | 9-036806 A | 2/1997 |

(Continued)

OTHER PUBLICATIONS

International Search Report issued in PCT/JP2008/056668, mailed on May 20, 2008, with translation, 5 pages.

(Continued)

*Primary Examiner* — Li Liu
(74) *Attorney, Agent, or Firm* — Osha Liang LLP

(57) ABSTRACT

A light transmission module includes an optical converter for converting an electrical signal to an optical signal; a light transmission path for transmitting the optical signal converted by the optical converter; an electrical transmission path for transmitting an input electrical signal; and a control instructing unit for instructing stop of drive to the optical converter based on a detection of an input electrical signal. When an input electrical signal having a predetermined frequency is detected, the input electrical signal having the predetermined frequency is converted to an optical signal and transmitted in the light transmission path. When input of an electrical signal other than the predetermined frequency is detected, the electrical signal other than the predetermined frequency is transmitted by the electrical transmission path without being converted to an optical signal due to the stop of the drive of the optical converter.

7 Claims, 31 Drawing Sheets

U.S. PATENT DOCUMENTS

| | | | |
|---|---|---|---|
| 2005/0105913 A1* | 5/2005 | Ozeki et al. | 398/140 |
| 2005/0281555 A1* | 12/2005 | Tomita et al. | 398/45 |
| 2006/0067608 A1* | 3/2006 | Kobayashi et al. | 385/14 |
| 2007/0008530 A1* | 1/2007 | Gibbs et al. | 356/368 |
| 2010/0067915 A1* | 3/2010 | Fukasaku et al. | 398/116 |

FOREIGN PATENT DOCUMENTS

| | | | |
|---|---|---|---|
| JP | 9-046769 A | | 2/1997 |
| JP | 9-186564 A | | 7/1997 |
| JP | 2000-286804 | * | 3/1999 |
| JP | 2000-286804 A | | 10/2000 |
| JP | 2001-042150 A | | 2/2001 |
| JP | 2003-244295 A | | 8/2003 |
| JP | 2004-129219 A | | 4/2004 |
| JP | 2004-312587 A | | 11/2004 |
| JP | 2005-018312 | * | 1/2005 |
| JP | 2005-018312 A | | 1/2005 |
| JP | 2005-167971 A | | 6/2005 |
| JP | 2006-033804 A | | 2/2006 |

OTHER PUBLICATIONS

Written Opinion issued in PCT/JP2008/056668, mailed on May 20, 2008, 5 pages.

Extended European Search Report issued in European Application No. 08739775.8, dated Mar. 28, 2013 (7 pages).

* cited by examiner

"01" (INDICATE END OF SIGNAL)

High pass filter

Low pass filter

OPTICAL TRANSMISSION MODULE

TECHNICAL FIELD

The present invention relates to a light transmission module including an optical converter for converting an electrical signal to an optical signal and a light transmission path for transmitting the optical signal converted by the optical converter to convert an input electrical signal having a predetermined frequency to an optical signal and transmitting the optical signal on the light transmission path.

BACKGROUND ART

In recent years, there is a demand to transmit large capacity data at high speed in data transmission in the device. To respond to such demand on high speed transmission of the large capacity data, light transmission that enables high speed transmission of data is used. Such light transmission has an advantage in that the signal of the data to be transmitted can be transmitted through the light transmission path (light guide) at high speed and without degrading.

If high speed transmission of data is not demanded, transmission by electrical signal as in the related art is preferably used as the power consumed for the signal transmission is smaller than the light transmission.

A so-called electrical/light complex transmission system in which the light transmission and the transmission by electrical signal can be simultaneously used has been proposed (e.g., patent documents 1 and 2).

In the system shown in patent document 1, electronic control units 101, 102 including an integrated circuit such as a CPU 111, 121 are coupled by optical fibers 103, 104 serving as light transmission paths and a start signal line 105 serving as an electrical transmission path, as shown in FIG. 36.

In the above-described electrical/light complex transmission system, a plurality of transmission paths is normally used in the data transmission in the device as in the portable telephone device of patent document 2 shown in FIG. 37. Such portable telephone device has a plurality of transmission paths coupled with an integrated circuit (control unit 205) for controlling input/output of electrical signals in each transmission path.

In order to reduce the circuit configuration of the electrical/light complex light transmission system, the input electrical signal is preferably switchable so as to be light-transmitted according to the characteristics such as the frequency of the electrical signal. That is, the circuit configuration of the electrical/light complex light transmission system can be reduced by being configured such that the light transmission path for transmitting and receiving electrical signals is commonly used between a plurality of electrical signal input units and a plurality of electrical signal output units, and only the electrical signal that is desirably transmitted at high speed is light-transmitted.

The configuration of such electrical/light complex light system may be a branched configuration in which the electrical signal of high frequency of the electrical signals input from the input terminal 301 . . . is transmitted in the light transmission path 304, and the electrical signal of low frequency is transmitted in the electrical transmission path 305, as shown in FIG. 38.

The electrical/light complex system includes a high pass filter (HPF) 302 for passing only the signal of high frequency and a low pass filter (LPF) 303 for passing only the signal of low frequency. In a case where the electrical signal input from an input terminal 301 is a signal of high frequency, the electrical signal can pass through the high pass filter 302, but cannot pass through the low pass filter 303. Thus, the electrical signal of high frequency is transmitted towards an output terminal 308 via a circuit line including an E/O (Electrical/Optical) converter 306 and an O/E (Optical/Electrical) converter 307 and arranged with the light transmission path 304.

Therefore, only the electrical signal of high frequency of the electrical signals input from the input terminal 301 can be light-transmitted by including the high pass filter 302 and the low pass filter 303.

However, in the conventional configuration capable of transmitting only the electrical signal of high frequency by the light transmission path using the high pass filter and the low pass filter, the entire circuit configuration related to such data transmission cannot be miniaturized and the power consumption cannot be reduced.

That is, the circuit configuration of the high pass filter includes a capacitor (C) on the electrical transmission path and sandwiches the electrical transmission path with resistors (R) so that voltage is applied on the path, as shown in FIG. 34. The circuit configuration of the low pass filter includes a capacitor (C) between the electrical transmission path and a GND transmission path, as shown in FIG. 35.

Therefore, the high pass filter has a larger circuit configuration than the low pass filter. Furthermore, the high pass filter also has a problem in that the power consumption increases compared to the low pass filter since voltage needs to be applied to the path to define the potential of a center value of the high frequency signal.

Therefore, the circuit configuration of the high pass filter is large and the power consumption increases even with the configuration of commonly using the light transmission path among a plurality of electrical signal input units and a plurality of electrical signal output units to reduce the circuit configuration related to data transmission, whereby sufficient miniaturization cannot be achieved and the power consumption cannot be reduced.

Patent document 1: Japanese Unexamined Patent Publication No. 5-193427 (date of publication: Aug. 3, 1993).
Patent document 2: Japanese Unexamined Patent Publication No. 2003-244295 (date of publication: Aug. 29, 2003).

DISCLOSURE OF THE INVENTION

In view of the above-described conventional problems, it is an object of the present invention to provide a light transmission module with a small circuit configuration capable of light-transmitting only appropriate data while reducing the power consumption.

A light transmission module according to the present invention includes an optical converter for converting an electrical signal to an optical signal, a light transmission path for transmitting the optical signal converted by the optical converter, and an electrical transmission path, an input electrical signal having a predetermined frequency being converted to an optical signal and transmitted in the light transmission path; the light transmission module including: a control instructing unit for instructing stop of drive to the optical converter when input of an electrical signal other than the predetermined frequency is detected, the electrical signal other than the predetermined frequency being transmitted by the electrical transmission path without being converted to an optical signal due to the stop of the drive of the optical converter.

According to the above configuration, the control instructing unit is arranged, and the electrical signal other than the predetermined frequency is transmitted to the electrical transmission path without being converted to an optical signal due to the stop of the drive of the optical converter, and thus only the electrical signal of the predetermined frequency can be converted to the optical signal and transmitted. In other words, the control instructing unit is configured by a logical circuit that performs a simple determination on whether or not the input of the electrical signal of the predetermined frequency is made.

In particular, when configured to transmit the electrical signal of high frequency as the optical signal, a configuration of transmitting the electrical signal of high frequency selected by the high-pass filter as the optical signal is considered, but the present application provides a circuit configuration simpler and with smaller power consumption than such configuration.

That is, the circuit configuration of the high-pass filter has a configuration in which a capacitor is arranged in the electrical transmission path, and the electrical transmission path is sandwiched with resistors so that voltage is applied to the path, where the circuit configuration becomes greater and the power consumption increases than the control instructing unit of the present application that can be configured with the logical circuit that performs the determination on whether or not the input of the electrical signal of the predetermined frequency is made.

Therefore, if the configuration of the light transmission module uses the high-pass filter, the circuit configuration itself related to the transmission of the signals becomes large and the power consumption increases.

Therefore, the light transmission module according to the present invention has an effect of light-transmitting only appropriate data with a small circuit configuration and while reducing the power consumption.

Other objects, advantages, and excelling aspects of the present invention should become apparent from the following description.

BRIEF DESCRIPTION OF THE DRAWINGS

FIG. 21(a) is a side cross-sectional view of the light transmission module and the external wiring substrate, and FIG. 21(b) is a plan view.

FIG. 22(a) is a side cross-sectional view of the light transmission module and the external wiring substrate, and FIG. 22(b) is a plan view.

FIG. 23(a) is a side cross-sectional view of the light transmission module and the external wiring substrate, and FIG. 23(b) is a plan view.

FIG. 24(a) is a side cross-sectional view of the light transmission module and the external wiring substrate 15, and FIG. 24(b) is a plan view.

FIG. 25(a) is a side cross-sectional view of the light transmission module and the external wiring substrate, and FIG. 25(b) is a plan view.

FIG. 26(a) is a side cross-sectional view of the light transmission module and the external wiring substrate, and FIG. 26(b) is a plan view.

BEST MODE FOR CARRYING OUT THE INVENTION

One embodiment of the present invention will be described below based on FIG. 1 to FIG. 32 and FIG. 34, 34 described above.

In other words, in the first embodiment, a configuration of a foldable portable telephone including a main body with operation keys, a lid with a display screen, and a hinge for rotatably connecting the main body and the lid, where information (data) transmission between the main body and the lid is performed through a light transmission module arranged in the hinge will be described by way of example.

Figure 3:
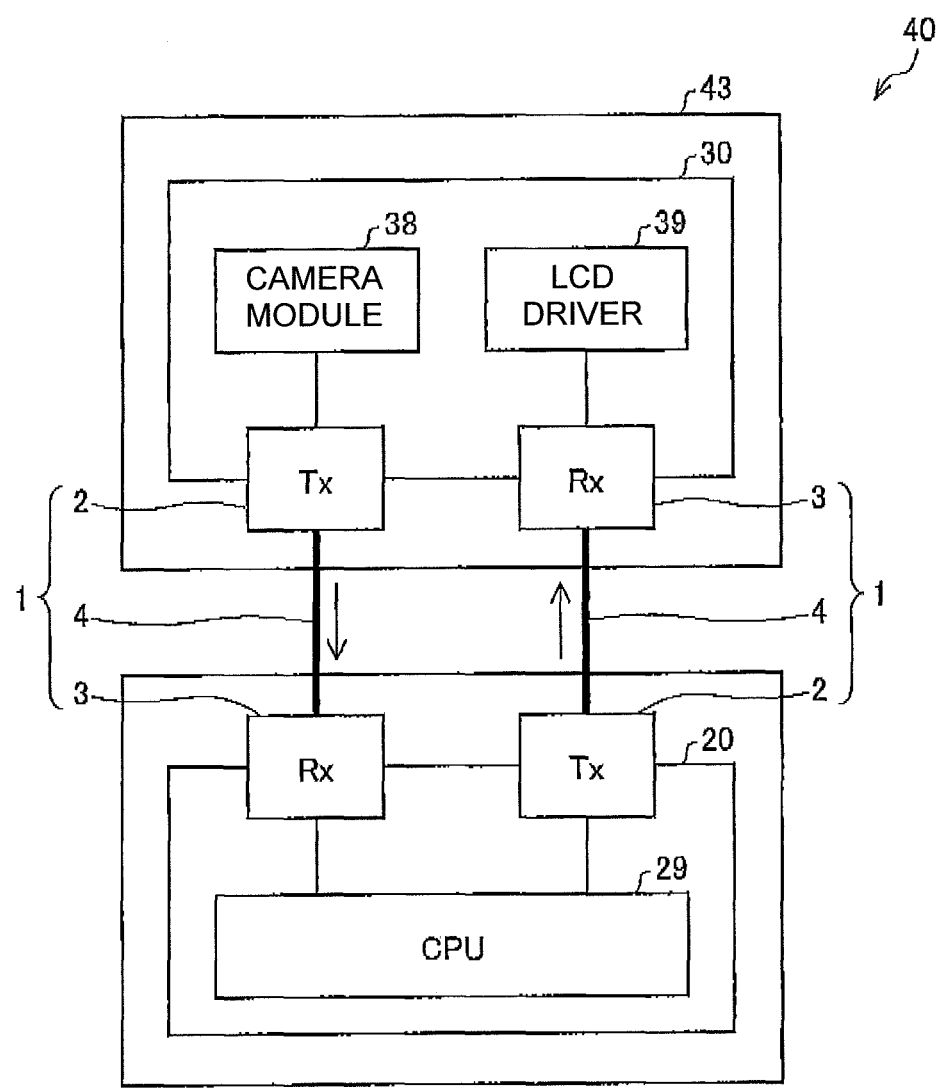
FIG. 3 is a block diagram showing a configuration of the main parts of a portion applied with the light transmission module in the foldable portable telephone shown in FIG. 2(a).

FIG. 2(a) is a perspective view showing an outer appearance of a portable telephone 40 incorporating a light transmission module 1 of the first embodiment. FIG. 2(b) is a perspective plan view of a hinge 41 (portion surrounded with a broken line) in FIG. 3A. FIG. 3 is a block diagram showing a configuration of the main parts of a portion applied with the light transmission module 1 in the portable telephone 40 shown in FIG. 2(a).

As shown in FIGS. 2(a), 2(b) and FIG. 3, the foldable portable telephone 40 (hereinafter simply referred to as portable telephone 40) according to the present embodiment is configured by a body unit 42, a hinge 41 arranged at one end of the body unit 42, and a lid 43 rotatably arranged with the hinge 41 as a shaft.

The body unit 42 includes an operation key 44 for operating the portable telephone 40, and interiorly includes a main control board 20. The main control board 20 is mounted with a CPU 29 for comprehensively controlling each element (not shown) mounted on the board 20.

The lid 43 exteriorly includes a display screen 45 and a camera (not shown) and interiorly includes an application circuit board 30. The application circuit board 30 is mounted with an LCD (Liquid Crystal Display) (not shown) for displaying images based on the image data transferred from the CPU 29, an LCD driver 39 for drive controlling the LCD, a camera module 38 including a camera for imaging a subject and a camera drive portion for drive controlling the camera, and the like.

In the portable telephone 40 having the above configuration, the light transmission module 1 connects the main control board 20 and the application circuit board 30, and performs signal transmission between the boards 20, 30. Specific examples of the signal transmitted from the main control board 20 to the application circuit board 30 include drive signals for driving the LCD driver 39 and the camera module 38, image data to be displayed on the LCD, image data signal transmission clock signal, or the like. Specific examples of the signal transmitted from the application circuit board 30 to the main control board 20 include image data signal imaged by the camera, image data signal transmission clock signal, or the like.

The image data signal to be displayed on the LCD or imaged by the camera, and the image data signal transmission clock signal are signals of high frequency, and are transmitted at high speed using the light transmission path 4. The drive signals for driving the LCD driver 39 and the camera module 38 are signals of low frequency and are transmitted by the electrical transmission path 5.

(Configuration of Light Transmission Module)

Figure 1:
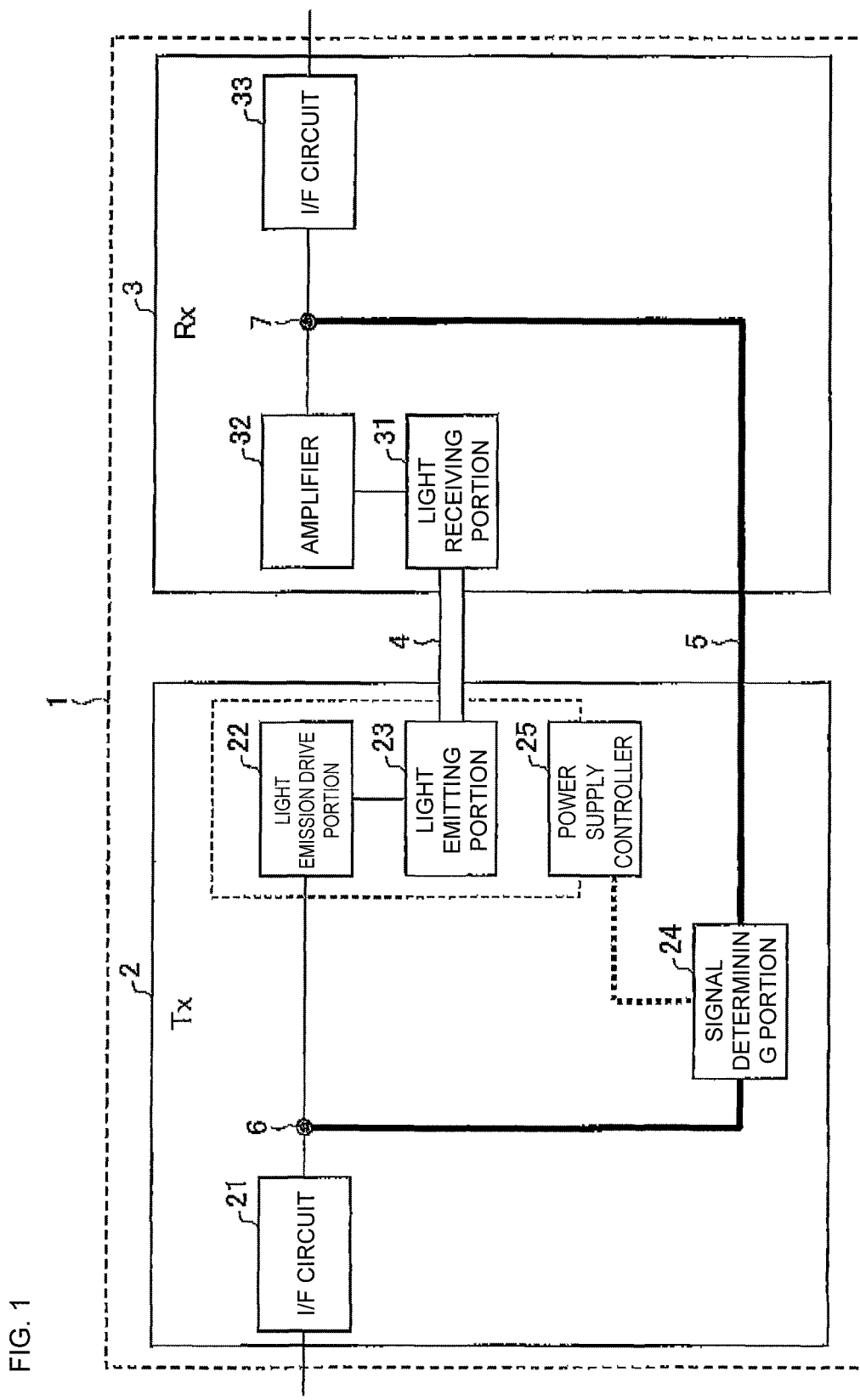
FIG. 1 is a block diagram showing a configuration of the main parts of the light transmission module, and showing an embodiment of the present invention.
Figure 2:
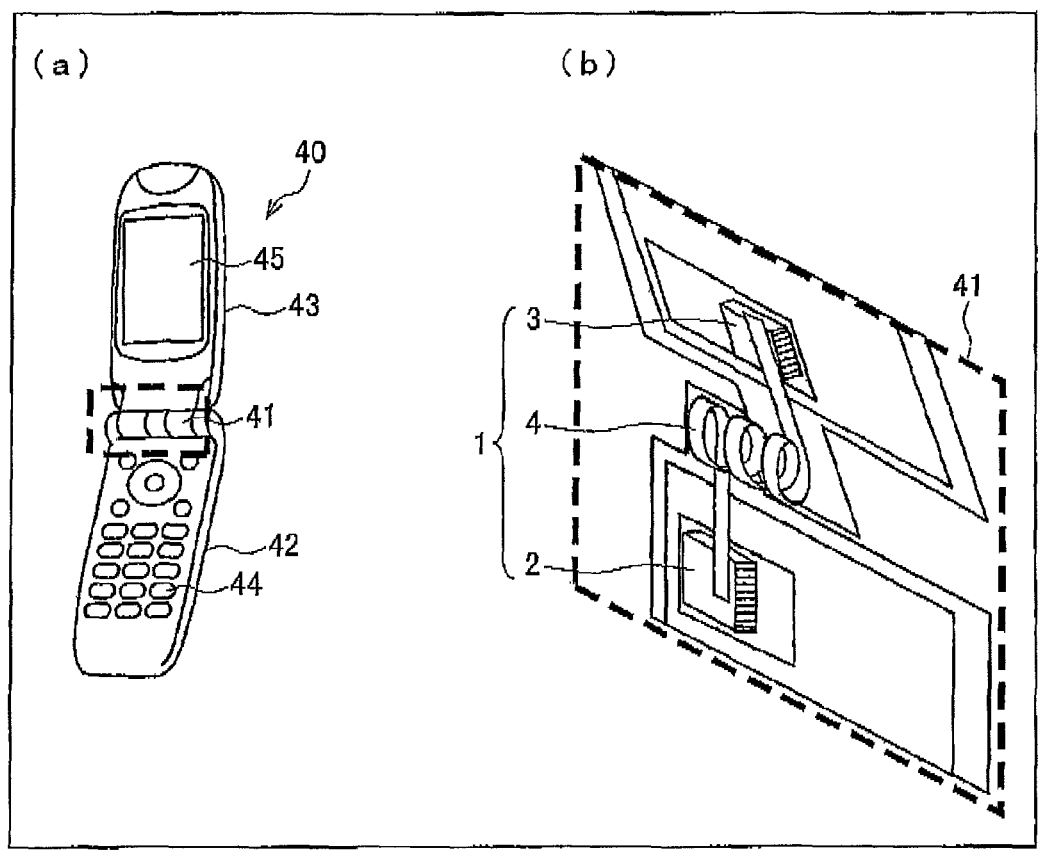
FIG. 2(a) is a perspective view showing an outer appearance of a foldable portable telephone incorporating a light transmission module of the present embodiment.
FIG. 2(b) is a perspective plan view of a hinge.
Figure 4:
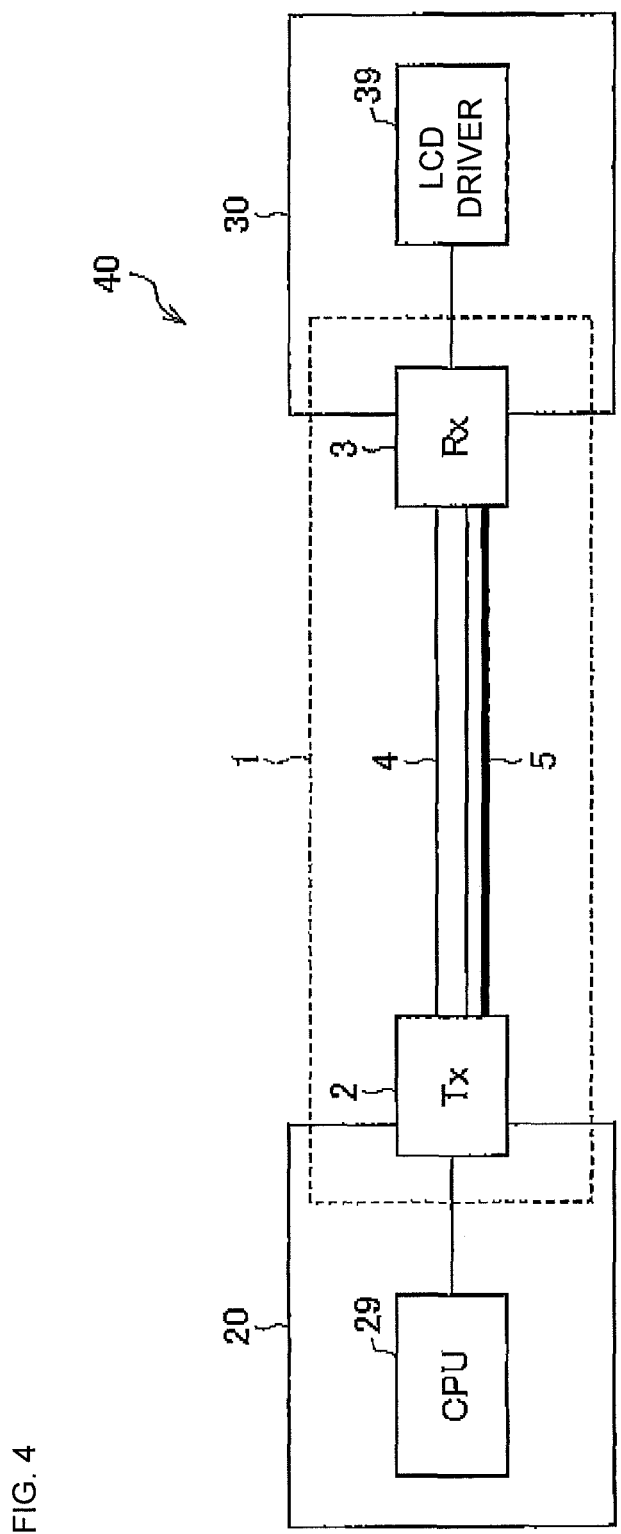
FIG. 4 is a block diagram showing an applied portion of the light transmission module in the portable telephone according to the present embodiment.

The configuration of the light transmission module 1 will now be described with reference to FIG. 1 and FIG. 4. FIG. 1 is a block diagram showing the configuration of the main parts of the light transmission module 1, showing an embodiment of the present invention. FIG. 4 is a block diagram showing the applied portion of the light transmission module 1 in the portable telephone 40 according to the present embodiment.

As shown in FIG. 1 and FIG. 4, the light transmission module 1 is configured to include a light transmission processing unit (light-transmitting unit; Tx) 2 connected to the main control board 20 for mounting the CPU 29, a light reception processing unit (light receiving unit; Rx) 3 connected to the application circuit board 30 for mounting the application circuit such as the LCD driver 39 and the camera module 38, a light transmission path 4 acting as an optical wiring for connecting the light transmission processing unit 2 and the light reception processing unit 3, and an electrical transmission path 5 acting as an electrical wiring for connecting the light transmission processing unit 2 and the light reception processing unit 3. In FIG. 4, the configuration regarding the camera module 38 is not illustrated for the sake of convenience of the explanation.

The light transmission path 4 is a medium for transmitting the optical signal serving as a data signal exit from the light emitting portion 23 to the light receiving portion 31. The electrical transmission path 5 is a medium for transmitting the electrical signal output from the light transmission processing unit 2 to the light reception processing unit 3. The details on the light transmission path 4 and the electrical transmission path 5 will be hereinafter described.

As shown in FIG. 1, the light transmission processing unit 2 includes an interface circuit (hereinafter referred to as I/F circuit) 21, a light emission drive portion 22, a light emitting portion 23, a signal determining portion 24, and a power supply controller (power controller) 25.

The I/F circuit 21 is a circuit for receiving signals having different frequency levels from the outside. The I/F circuit 21 includes an electrical connecting portion 10, to be hereinafter described, for connecting with the electrical wiring for transmitting the externally input electrical signal, and is arranged between the electrical wiring for the electrical signal externally input to the light transmission module 1 and the light emission drive portion 22 or the signal determining portion 24.

In the light transmission module 1 according to the present embodiment, a branched portion 6 is arranged between the I/F circuit 21, and the light emission drive portion 22 and the signal determining portion 24. The externally input electrical signal is output from the I/F circuit 21 to the light emission drive portion 22 and the signal determining portion 24 through the branched portion 6.

The light emission drive portion 22 drives the light emission of the light emitting portion 23 based on the electrical signal externally input to the light transmission module 1 through the I/F circuit 21. The light emission drive portion 22 is configured by a light emission drive IC (Integrated Circuit), and the like.

The light emitting portion 23 emits light based on the drive control by the light emission drive portion 22. The light emitting portion 23 is configured by a light emitting element such as a VCSEL (Vertical Cavity-Surface Emitting Laser). The light incident side end of the light transmission path 4 is irradiated with the light emitted from the light emitting portion 23 as an optical signal.

The signal determining portion 24 monitors the signal input from the main control board 20, and determines whether such signal is the electrical signal of high frequency or the electrical signal of low frequency. The signal determining portion 24 outputs the control signal to the power supply controller 25 according to the determined result. The details of the signal determining portion 24 will be hereinafter described.

The power supply controller 25 comprehensively controls the power supply of each portion configuring the light transmission processing unit 2 based on the control signal output from the signal determination processing portion 24. Specifically, the power supply controller 25 supplies power to the light emission drive portion 22, and the light emitting portion 23 to drive them, while shielding the supply of power to the light emission drive portion 22, and the light emitting portion 2 and stops the same based on the control signal.

The light transmission processing unit 2 converts the electrical signal input to the light transmission processing unit 2 to the optical signal corresponding to the electrical signal and outputs the optical signal to the light transmission path 4, and has the power supply of each portion configuring the interior thereof controlled by the power supply controller 25.

The light reception processing unit 3 includes a light receiving portion 31, an amplifier 32, and an I/F circuit 33.

The light receiving portion 31 receives the light serving as the optical signal exit from the light exit side end of the light transmission path 4, and outputs the electrical signal by photoelectric conversion. The light receiving portion 31 is configured by a light receiving element such as a PD (Photo-Diode).

The amplifier 32 amplifies the electrical signal output from the light receiving portion 31 to a desired value, and outputs the desired value to the outside. The amplifier 32 is configured by an amplification IC, and the like.

The I/F circuit 33 is a circuit for outputting the electrical signal amplified by the amplifier 32 to the outside of the light transmission module 1. The I/F circuit 33 includes an electrical connecting portion 10, to be hereinafter described, for connecting with the electrical wiring for transmitting the electrical signal to the outside, and is arranged between the amplifier 32 or the signal determining portion 24 and the electrical wiring.

In the light transmission module 1 according to the preset embodiment, a coupling portion 7 is arranged between the amplifier 32 and the signal determining portion 24 and the I/F circuit 21. The signal received from the light transmission processing unit 2 through the light transmission path 4 or the electrical transmission path 5 is input to the I/F circuit 33 through the coupling portion 7.

Thus, the light reception processing unit 3 receives the optical signal output from the light transmission processing unit 2 through the light transmission path 4 or the electrical transmission path 5, converts the optical signal to the electrical signal corresponding to the optical signal, and amplifies the electrical signal to the desired signal value and outputs to the outside.

(Configuration of Light Transmission Path)

The details of the light transmission path 4 will be described using FIG. 5(a) and FIG. 5(b). FIG. 5(a) shows a side view of the light transmission path 4. As shown in the figure, the light transmission path 4 has a configuration including a column-shaped core 4α having a light transmission direction as an axis, and a clad 4B arranged to surround the periphery of the core 4α. The core 4α and the clad 4B are made of materials having translucency, where the index of refraction of the core 4α is higher than the index of refraction of the clad 4B. The optical signal that entered the core 4α is transmitted in the light transmission direction by being totally reflected repeatedly inside the core 4α.

Glass, plastic, or the like may be used for the material for forming the core 4α and the clad 4B, but resin material of acryl series, epoxy series, urethane series, silicone series and the like is preferably used to form the light transmission path 4 having sufficient flexibility. The clad 4B may be made of gas such as air. Furthermore, similar effects can be obtained even if the clad 4B is used under a liquid atmosphere having smaller index of refraction than the core 4α.

Figure 5:
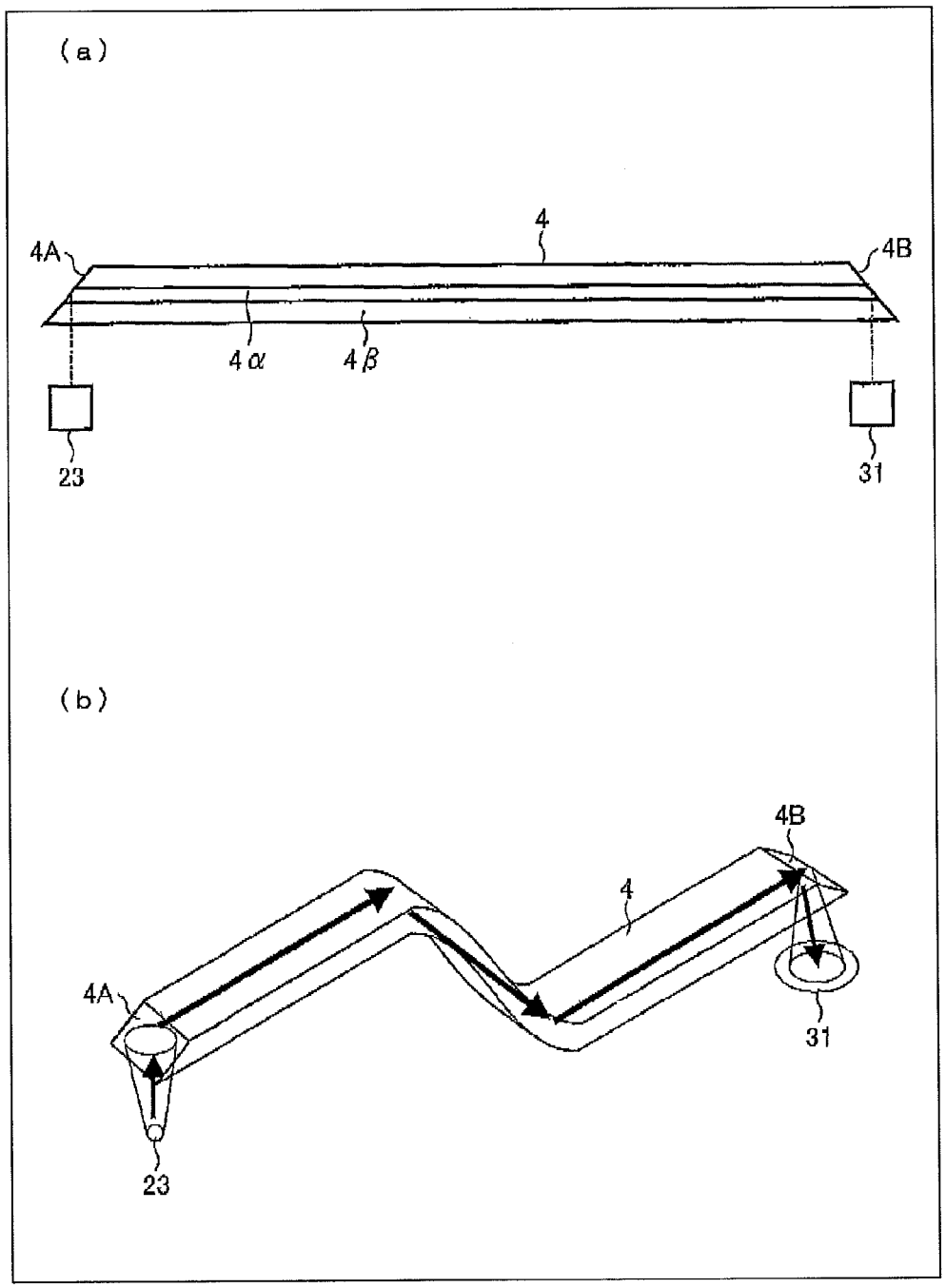
FIG. 5(a) is a side view of the light transmission path.
FIG. 5(b) is a view schematically showing a state of light transmission in the light transmission path.

A mechanism of light transmission by the light transmission path 4 will be described using FIG. 5(*b*). FIG. 5(*b*) schematically shows a state of light transmission in the light transmission path 4. As shown in the figure, the light transmission path 4 is configured by a column-shaped member having flexibility. A light incident surface 4A is provided on the light incident side end of the light transmission path 4, and a light exit surface 4B is provided on the light exit side end.

The light emitted from the light emitting portion 23 enters the light incident side end of the light transmission path 4 from a direction perpendicular to or substantially perpendicular to the light transmission direction of the light transmission path 4. The incident light is introduced into the light transmission path 4 by being reflected at the light incident surface 4A and advances through the core 4α. The light that advanced through the light transmission path 4 and reached the light exit side end is reflected at the light exit surface 4B and exit in a direction perpendicular to or substantially perpendicular to the light transmission direction of the light transmission path 4. The light receiving portion 31 is irradiated with the exit light, and the exit light is photoelectric converted in the light receiving portion 31.

According to such configuration, the light emitting portion 23 serving as a light source can be arranged in a direction perpendicular to or substantially perpendicular to the light transmission direction in the light transmission path 4. Thus, when the light transmission path 4 needs to be arranged parallel to the substrate surface, the light emitting portion 23 is installed between the light transmission path 4 and the substrate surface so as to emit light in a normal direction of the substrate surface. Such configuration facilitates mounting and enables further miniaturization in configuration than the configuration of installing the light emitting portion 23 so as to emit light parallel to the substrate surface. This is because the general configuration of the light emitting portion 23 is such that a size in a direction perpendicular to a direction of emitting light is larger than the size in a direction of emitting light. Furthermore, application can be made to a configuration of using a plane mounting light emitting element in which the electrode and the light emitting portion 23 are in the same plane.

The light transmission path 4 shown in the figure has a configuration in which the light incident surface 4A and the light exit surface 4B are inclined, as described above, but the light transmission path 4 in the present embodiment may have a configuration in which both end surfaces are orthogonal to the light transmission direction. In other words, the outer shape of the light transmission path 4 may be formed to a solid rectangular shape.

(Configuration of Electrical Transmission Path)

The details of the electrical transmission path 5 will be described below. The electrical transmission path 5 is arranged parallel to the light transmission path 4, and connects the light transmission processing unit 2 and the light reception processing unit 3 to transmit the electric signal of low frequency output from the light transmission processing unit 2 to the light reception processing unit 3.

Specifically, as shown in FIG. 1, the electrical transmission path 5 connects the I/F circuit 21 through the branched portion 6 and the I/F circuit 33 through the coupling portion 7, and inputs the electrical signal output from the I/F circuit 21 to the I/F circuit 33. In the electrical transmission path 5, the signal determining portion 24 is arranged between the branched portion 6 and the coupling portion 7. When determining that the electrical signal input from the outside has high frequency, the signal determining portion 24 does not output the relevant electrical signal to the I/F circuit 33. Thus, a zone from the signal determining portion 24 to the coupling portion 7 in the electrical transmission path 5 transmits only the electrical signal of low frequency.

Figure 6:
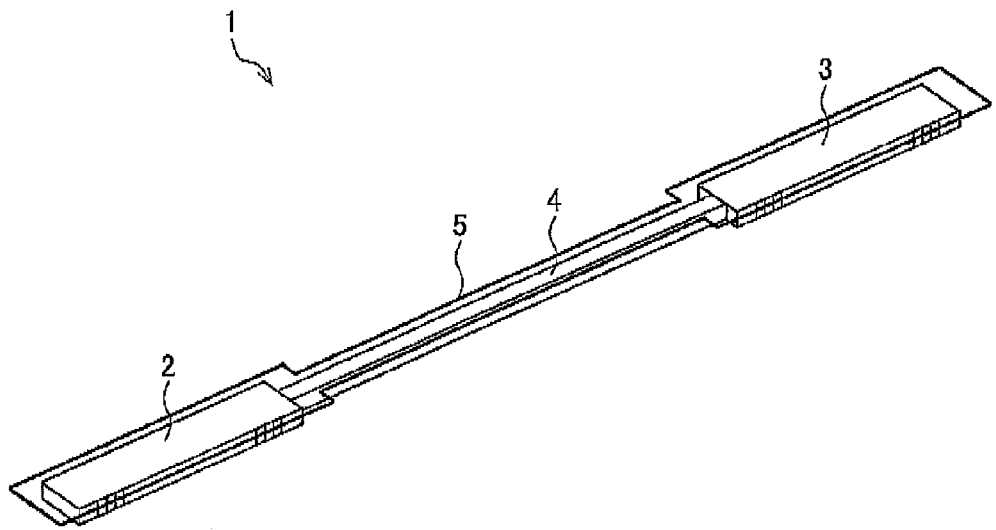
FIG. 6 is a perspective view showing a schematic configuration of the light transmission module when the electrical transmission path is configured by FPC.

The electrical transmission path 5 is specifically configured by a flexible printed circuit board (FPC), coaxial cable, and the like. FIG. 6 is a perspective view showing a schematic configuration of the light transmission module 1 when the electrical transmission path 5 is configured by the FPC. The light transmission module 1 thus can be applied to a small electronic device such as a portable telephone by forming the light transmission path 4 and the electrical transmission path 5 with a flexible wiring.

(Configuration of Signal Determining Portion)

The details of the signal determining portion 24 will be described below. The signal determining portion 24 is arranged on the electrical transmission path 5 as shown in FIG. 1, and determines whether the frequency of the electrical signal (input signal) input from the outside through the I/F circuit 21 and the branched portion 6 is high frequency or low frequency. The signal determining portion 24 outputs to the power supply controller 25 a signal (stop signal) indicating the stop command of the power supply to each portion when determining that the input signal is not high frequency, that is, it is low frequency. The signal determining portion 24 outputs to the power supply controller 25 a signal (start signal) indicating the start command to start the power supply to each portion when determining that the input of the input signal of low frequency is stopped or that the input signal of low frequency is changed to high frequency.

Thus, the signal determining portion 24 determines whether the input signal with respect to the light transmission module 1 is a signal of high frequency or a signal of low frequency, and outputs a control signal based on the determination result, that is, a signal indicating the start command or the stop command.

A method the signal determining portion 24 determines whether the input signal in the light transmission processing unit 2 is a signal of high frequency or a signal of low frequency will be described below using four methods by way of example.

As a first method, when the input signal is input to the signal determining portion 24 as a single end signal through the I/F circuit 21, the signal determining portion 24 obtains the frequency from the voltage level of the input signal, and determines whether the input signal is a signal of high frequency or a signal of low frequency.

Figure 7:
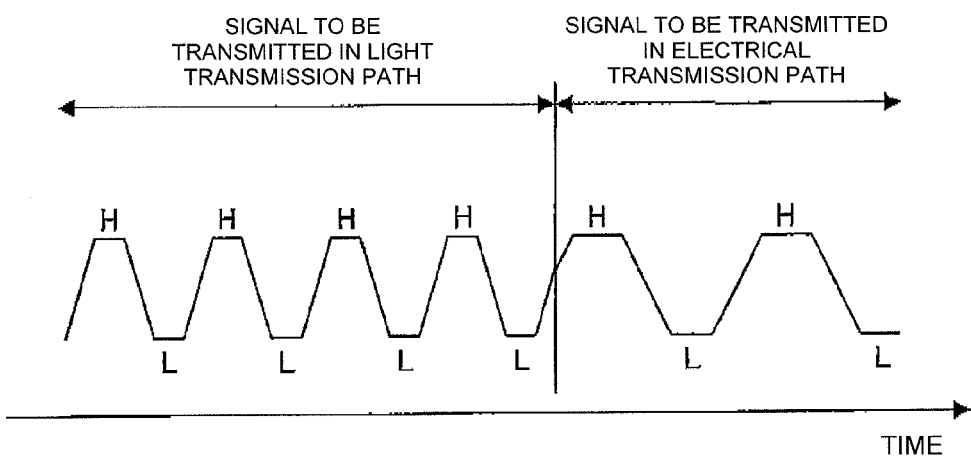
FIG. 7 is a view showing one example of difference of the input signal.

In other words, when the input signal is a single end signal, "L" and "H" are determined with the voltage level of the input signal, as shown in FIG. 7, with the ground (0V) as a reference. For instance, in the LVTTL or the TTL standard of 3.3 V series, greater than or equal to +2.0 V is determined as "H" level and smaller than or equal to 0.8 V is determined as "L" level with the ground level as a reference. Therefore, the frequency of the input signal can be obtained from the "H" and the "L" of the voltage level.

The signal determining portion 24 determines whether or not the input signal is a signal of high frequency based on the obtained frequency.

As a second method, the signal determining portion 24 can determine whether the input signal is a signal of high frequency or a signal of low frequency from the cycle of the waveform of the input signal. In other words, in the case of the signal of high frequency, a period in which the "H" level or the "L" level shown in FIG. 7 appears becomes shorter than in the case of the signal of low frequency. Whether or not the input signal is a signal of high frequency is thus determined using the difference in cycle.

Specifically, the signal determining portion 24 determines whether or not the period in which the "H" level or the "L" level shown in FIG. 7 of the input signal appears is smaller than a predetermined period, and determines that the input signal is a signal of high frequency when smaller.

Figure 8:
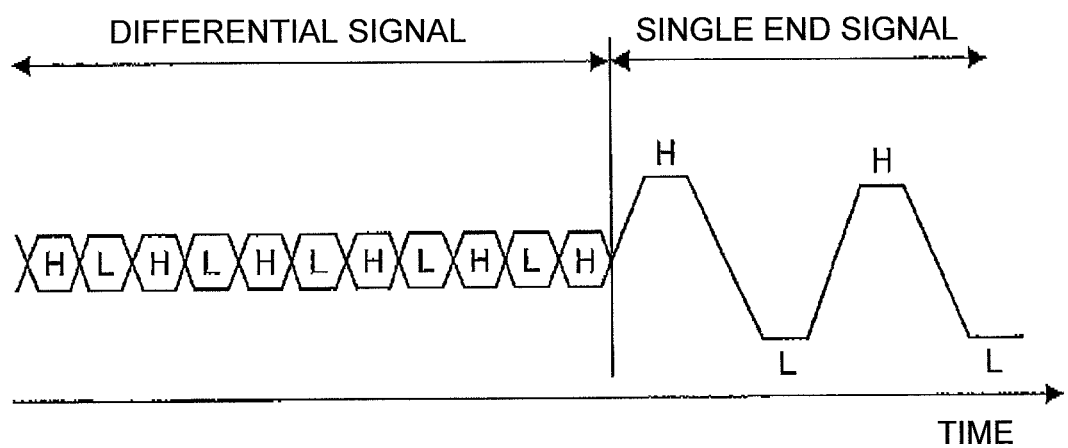
FIG. 8 is a view showing one example of difference of the input signal.

As a third method, the following assumption is set to the input signal. The setting is made such that when the input signal is a signal of high frequency as shown in FIG. 8, it is input as a differential signal having strong resistance to noise from the I/F circuit 21 to the signal determining portion 24, and when the input signal is a signal of low frequency, it is input as a single end signal.

The differential signal is a signal transmitted in two signal lines of "+" and "−", where the signal level can be indicated with a potential difference of the "+" signal line and the "−" signal line. The signal level is "H" when the difference of the two signals is "+" and "L" when the difference is "−".

In such assumption, the signal determining portion 24 determines whether the input signal is the differential signal or the single end signal, and determines whether the input signal is a signal of high frequency or a signal of low frequency.

As a fourth method, the light transmission module 1 is configured to transmit the signal of high frequency at a voltage smaller than that of the signal of low frequency, and the signal determining portion 24 determines whether the input signal is a signal of high frequency depending on whether the voltage of the input signal is lower or higher than the voltage that becomes a reference.

Normally, the input signal can be transmitted at a voltage of a wide range in the electrical transmission path, but the drive voltage of the light emission drive portion 22 is determined and thus a voltage range in which the input signal can be transmitted is limited in the light transmission path.

The input signal is transmitted through the light transmission path if the voltage of the relevant input signal is smaller than the voltage that becomes a reference, and the input signal is transmitted through the electrical transmission path if the voltage is greater than the voltage that becomes a reference. The voltage that becomes a reference can be set with a value with which determination can be made on whether or not it is the drive voltage of the light emission drive portion 22.

When configured as above, the signal determining portion 24 can determine whether the input signal is a signal of high frequency or a signal of low frequency depending on whether the voltage of the input signal is higher or lower than the voltage that becomes a reference. The determination on high and low of the voltage of the input signal by the signal determining portion 24 is made based on whether or not the amplitude in the signal waveform of the input signal is greater than the amplitude of the signal that becomes a reference.

The signal determining portion 24 can be configured as below other than in the first to the fourth methods, and the signal (start signal) indicating the start command of the power supply to each portion may be output to the power supply controller 25 or the signal (stop signal) indicating the stop command of the power supply to each portion may be output to the power supply controller 25.

Figure 32:
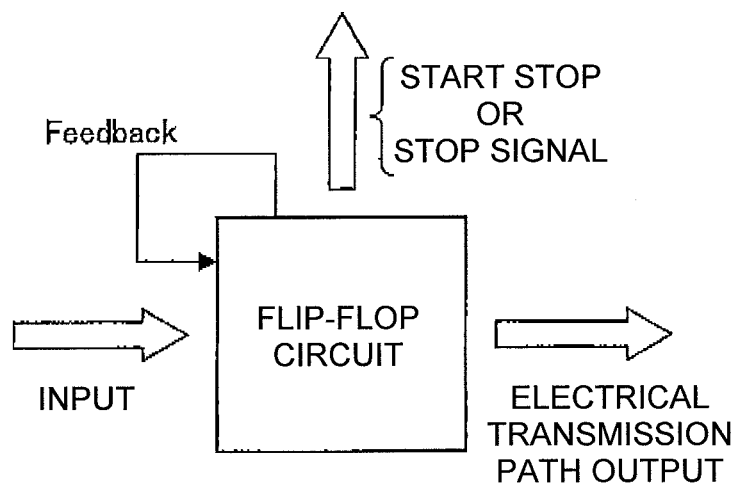
FIG. 32 is a view showing one example of a flip-flop circuit for realizing a signal determining portion of the light transmission module according to the present embodiment.
Figure 33:
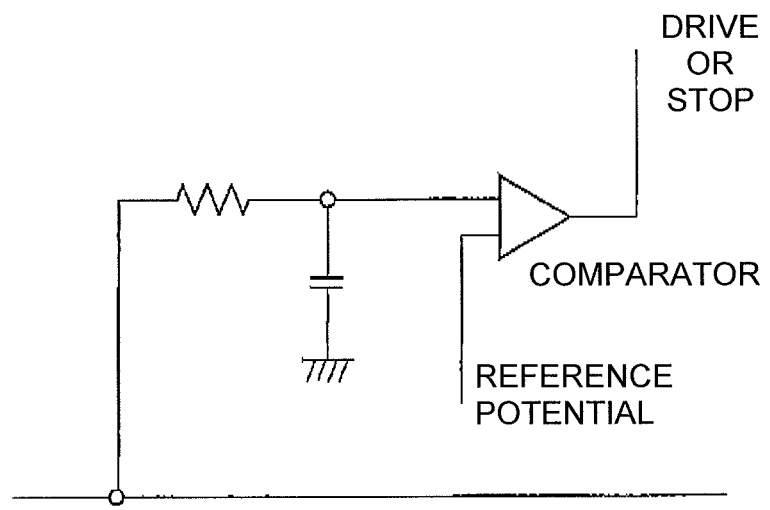
FIG. 33 is a view showing one example of a comparator for realizing a signal determining portion of the light transmission module according to the present embodiment.

Specifically, the signal determining portion 24 may be realized as below using a flip-flop circuit shown in FIG. 32 or a comparator shown in FIG. 33.

In other words, if the signal determining portion 24 is realized by a flip-flop circuit, a bit "11" is set as a control command at the head and the end of a low frequency signal train and the control command "11" is not set in other portions of the signal train in the light transmission module 1 according to the present embodiment. The control command "11" is not set in the high frequency signal train.

Furthermore, in the flip-flop circuit, the control signal output from the signal determining portion 24 to the power supply controller 25 is changed when the input control command is "11", and the control signal is fed back and the state is maintained at times other than when the input control command is "11".

For instance, in a state the power supply controller 25 supplies power to each portion, the electrical signal of high frequency is input to the signal determining portion 24 through the electrical transmission path 5. In this case, the flip-flop circuit feeds back and maintains a state of drive instructed by the control signal, that is, a state indicating the start command.

When the electrical signal of low frequency is transmitted through the electrical transmission path 5 and input to the signal determining portion 24, the control command "11" set at the head of the signal train is read and the control signal to output to the power supply controller 25 is changed from the start signal to the stop signal in the flip-flop circuit. In the flip-flop circuit, while "11" is read as the control command set at the head of the signal train until the command "11" at the end of the signal train is read (period not including "11"), the state of drive (state indicting stop command) instructed by the control signal is fed back and maintained.

When the control command "11" set at the end of the signal train is read, the control signal is changed from the stop signal to the start signal. The control command is shown with "11" above, but this is not the sole case, and the change of the control signal can be appropriately set with a configuration set by an arbitrary number of bits of greater than or equal to two bits or a combination thereof.

If the signal determining portion 24 is realized by a comparator, the electrical signal of high frequency is set such that the average potential thereof does not become greater than the reference potential, and the electrical signal of low frequency is set such that the average potential thereof becomes greater than the reference potential in the light transmission module 1 according to the present embodiment. The comparator outputs "0" to the power supply controller 25 to obtain a state where power is supplied to each portion when the average potential of the input electrical signal is not greater than the reference potential.

The comparator outputs "1" to the power supply controller 25 to stop the power supply to each portion when the average potential of the input electrical signal is greater than the reference potential.

Figure 9:
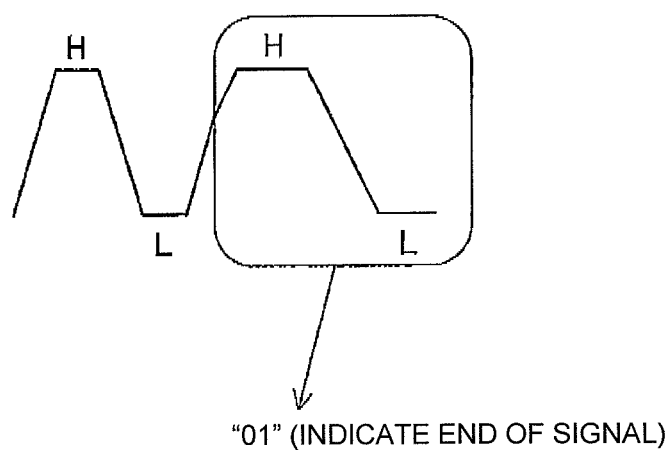
FIG. 9 is a view showing one example of embedding predetermined information indicating the last of the signal at the end of the input signal of low frequency transmitted in the light transmission module according to the present embodiment.

A method in which the signal determining portion 24 determines a case where the input of the input signal of low frequency is stopped in the light transmission processing unit 2 will be described with reference to FIG. 9. As shown in FIG. 9, in the light transmission module 1 according to the present embodiment, predetermined information ("01" in FIG. 9) indicating the last of the signal is embedded at the end of the signal to be transmitted in the electrical transmission path 5, that is, the input signal of low frequency. The signal determining portion 24 can determine the stop of input of the input signal of low frequency by reading the predetermined information.

When the stop of input of the input signal of low frequency is confirmed, the signal determining portion 24 outputs a signal indicating the start command to the power supply controller 25.

Therefore, in the light transmission module 1 according to the present embodiment, only the electrical signal of high frequency can be converted to an optical signal and transmitted since the signal determining portion 24 is arranged.

The signal determining portion 24 can be configured by a logical circuit that performs a simple determination on whether the input of high frequency electrical signal is made or the input of the low frequency electrical signal is made. Thus, a configuration of arranging a high-pass filter (HPF) for passing only the electrical signal of high frequency so that only the electrical signal of high frequency is input to the light emission drive portion 22 is considered as a configuration of transmitting only the electrical signal of high frequency, but the light transmission module 1 according to the present embodiment can adopt a smaller circuit configuration that can reduce the power consumption than the above configuration.

Figure 34:
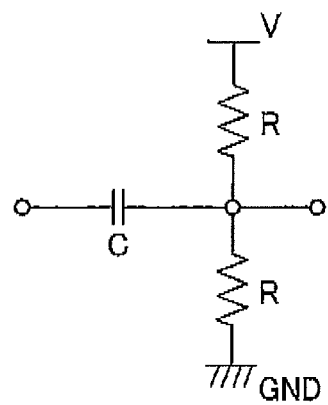
FIG. 34 is a view showing one example of a circuit configuration of a high pass filter.

That is, in the case of the circuit configuration using the high-pass filter, a capacitor is arranged on the electrical transmission path as shown in FIG. 34, and the electrical transmission path is sandwiched with resistors to apply voltage to the path. The high-pass filter thus has greater circuit configuration and confirms the potential at a center value of the high frequency signal, whereby voltage needs to be applied to the path and the power consumption increases.

Therefore, the light transmission module 1 according to the present embodiment can light-transmit only appropriate data, that is, the electrical signal of high frequency with a simple and small circuit configuration.

(Variant 1-1-1)

Here, a "variant 1-1-1" will be described as a variant of the light transmission module 1 according to the present embodiment with reference to FIG. 10.

Figure 10:
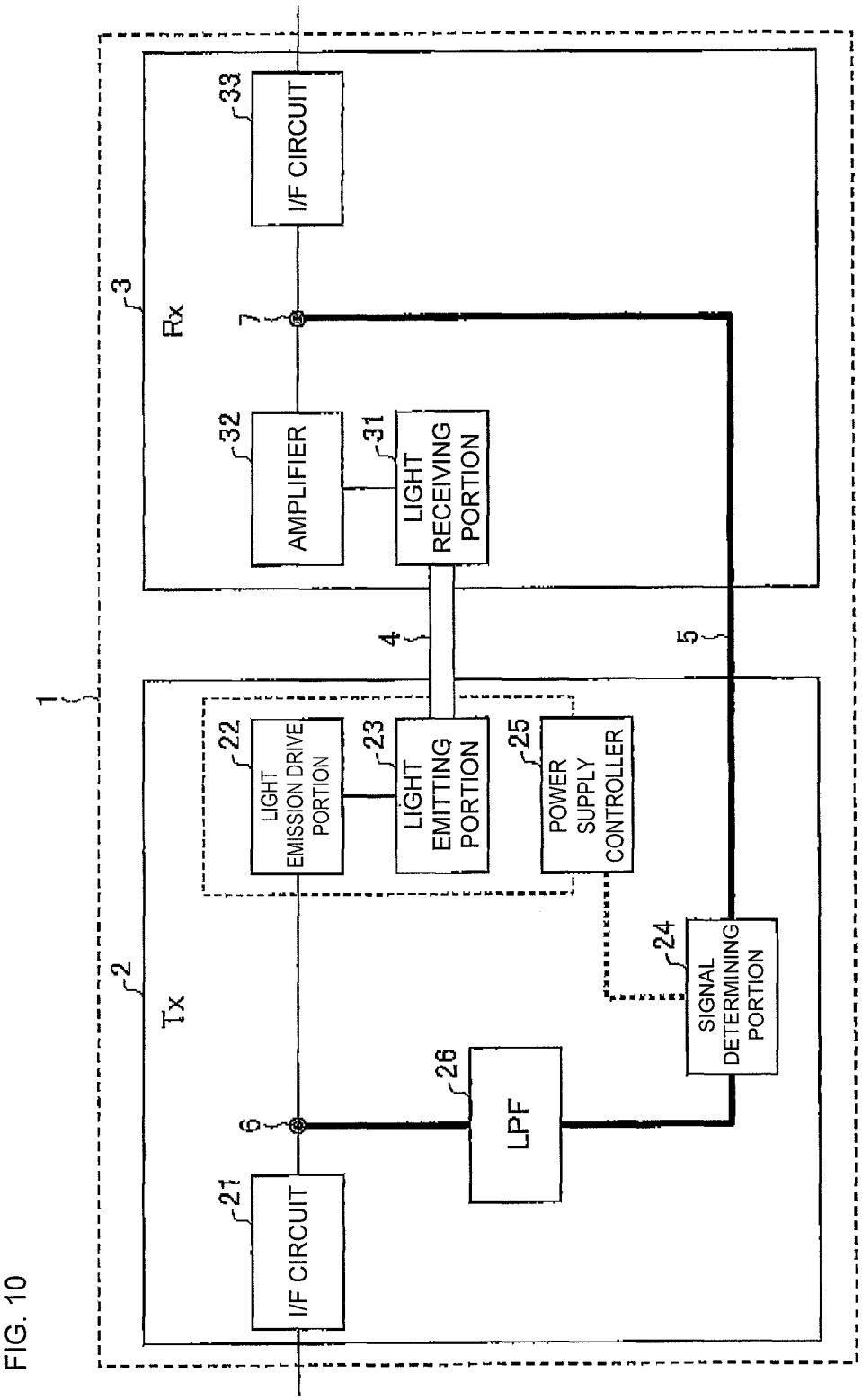
FIG. 10 is a view showing a configuration of the main parts of a light transmission module serving as "variant 1-1-1" according to the present embodiment.
Figure 35:
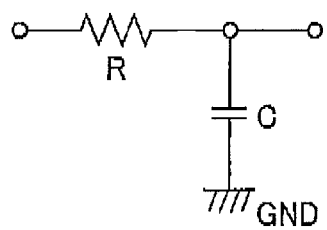
FIG. 35 is a view showing one example of a circuit configuration of a low pass filter.
Figure 36:
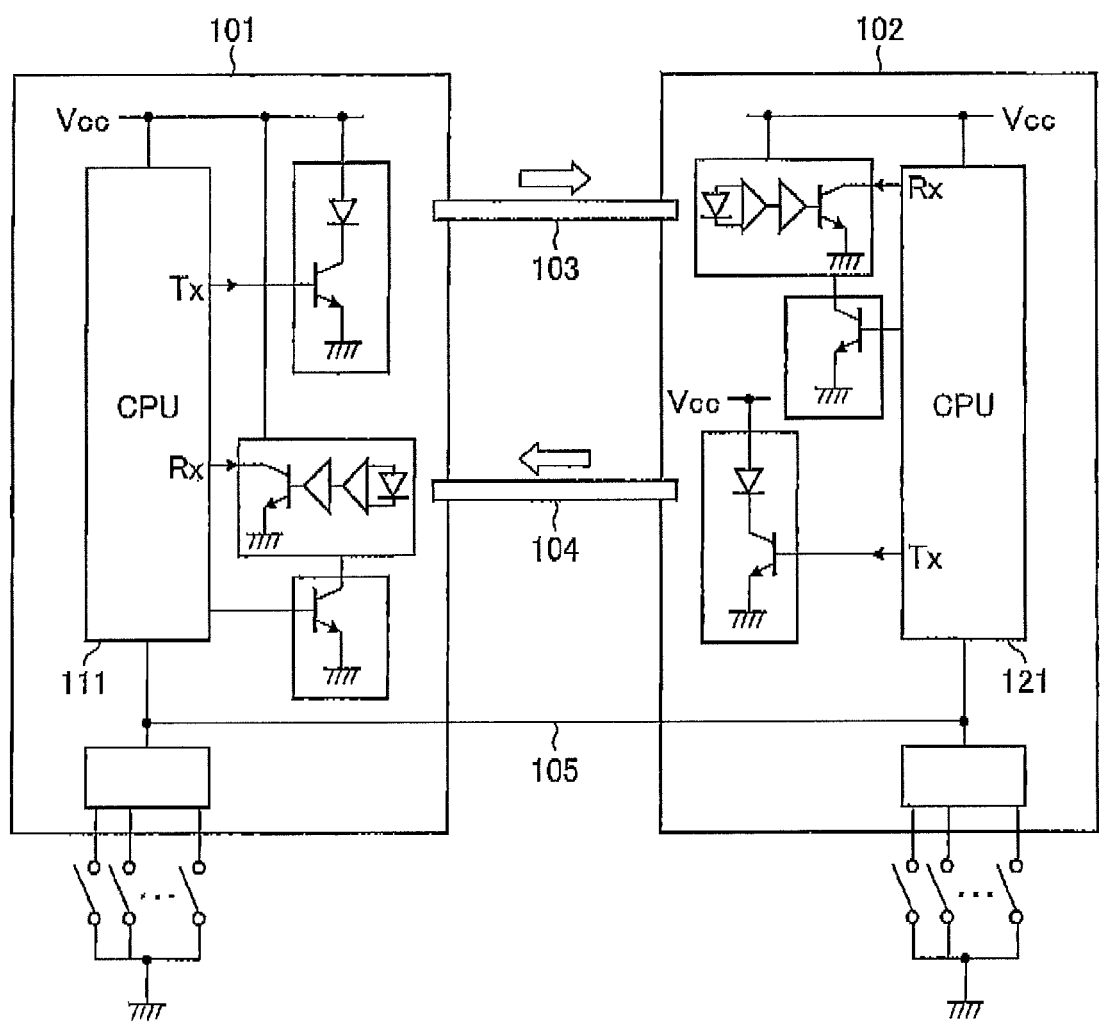
FIG. 36 is a view of a related art showing a configuration in which electronic control units including an integrated circuit such as a CPU are connected with a light receiving circuit (optical fiber) serving as a light transmission path and a start signal line serving as an electrical transmission path.
Figure 37:
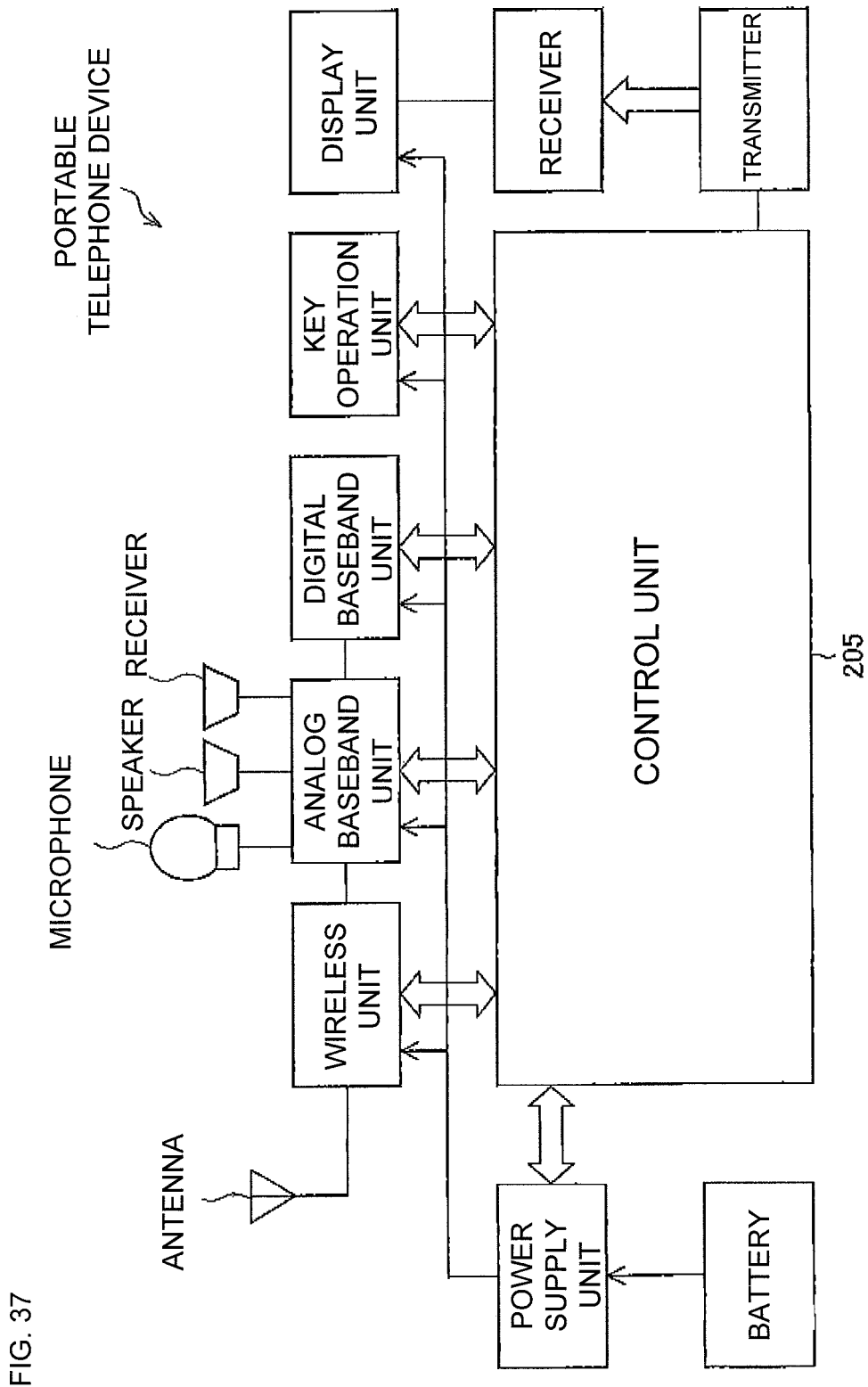
FIG. 37 is a view of a related art showing a configuration in which a plurality of transmission paths is coupled with an integrated circuit for controlling input/output of electrical signals in each transmission path.
Figure 38:
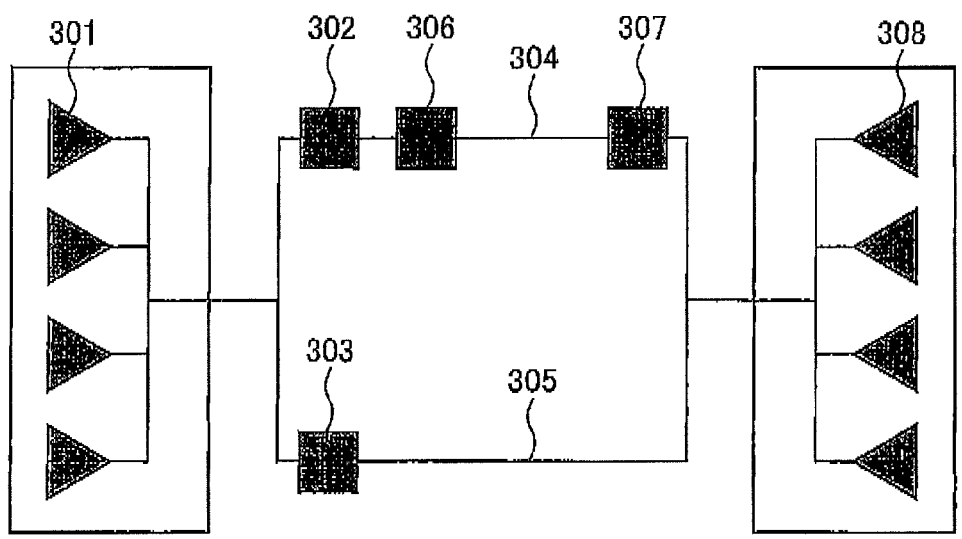
FIG. 38 is a view of a related art showing a configuration of an electrical/light complex system branched so that an electrical signal of high frequency of the electrical signals input from an input terminal is transmitted in the light transmission path and an electrical signal of low frequency is transmitted in the electrical transmission path.

In other words, as shown in FIG. 10, a low-pass filter (LPF) 26 for passing only the electrical signal of low frequency may be arranged between the branched portion 6 and the signal determining portion 24 in the electrical transmission path 5 in the circuit configuration of the light transmission module 1 shown in FIG. 1. The circuit configuration of the LPF 26 is realized by a circuit configuration shown in FIG. 35.

When configured as above, the signal determining portion 24 determines only the presence of input of the electrical signal, and transmits the control signal indicating the stop command to the power supply controller 25 when determined that the input of the electrical signal is present. In other words, when the electrical signal of high frequency is externally input, the electrical signal transmitted towards the LPF 26 of the electrical signals branched at the branched portion 6 cannot pass through the filter. The electrical signal transmitted towards the light emission drive portion 22 is converted to an optical signal by the light emitting portion 23 under the control of the light emission drive portion 22, and output to the light reception processing unit 3 through the light transmission path 4.

When the electrical signal of low frequency is externally input, the electrical signal transmitted towards the LPF 26 of the electrical signals branched at the branched portion 6 is input to the signal determining portion 24 through the LPF 26. When detecting the input of the electrical signal, the signal determining portion 24 transmits the control signal indicating the stop command to the power supply controller 25 and outputs the input electrical signal as is to the light reception processing unit 3 through the electrical transmission path 5.

The transmission of the electrical signal directed to the light emission drive portion 22 of the electrical signals branched at the branched portion 6 is interrupted at the light emission drive portion 22 since the power supply of the light emission drive portion 22 and the light emitting portion 23 is stopped by the control of the power supply controller 25.

When the electrical signal of high frequency is externally input, the transmission of the electrical signal transmitted towards the LPF 26 of the electrical signals branched at the branched portion 6 is interrupted without passing the LPF 26.

The electrical signal directed to the light emission drive portion 22 of the electrical signals branched at the branched portion 6 is converted to the optical signal by the light emitting portion 23 by the control of the light emission drive portion 22 as the light emission drive portion 22 and the light emitting portion 23 are in the drive state. The optical signal is then output to the light reception processing unit 3 through the light transmission path 4.

In the circuit configuration of the light transmission module 1 shown in FIG. 10, the signal determining portion 24 is arranged at a position of receiving the output of the LPF 26 in the electrical transmission path 5, but the position of arranging the signal determining portion 24 is not limited to such position. Further variant of the light transmission module 1 shown in FIG. 10 will be described below as a "variant 1-1-2".

(Variant 1-1-2)

Figure 11:
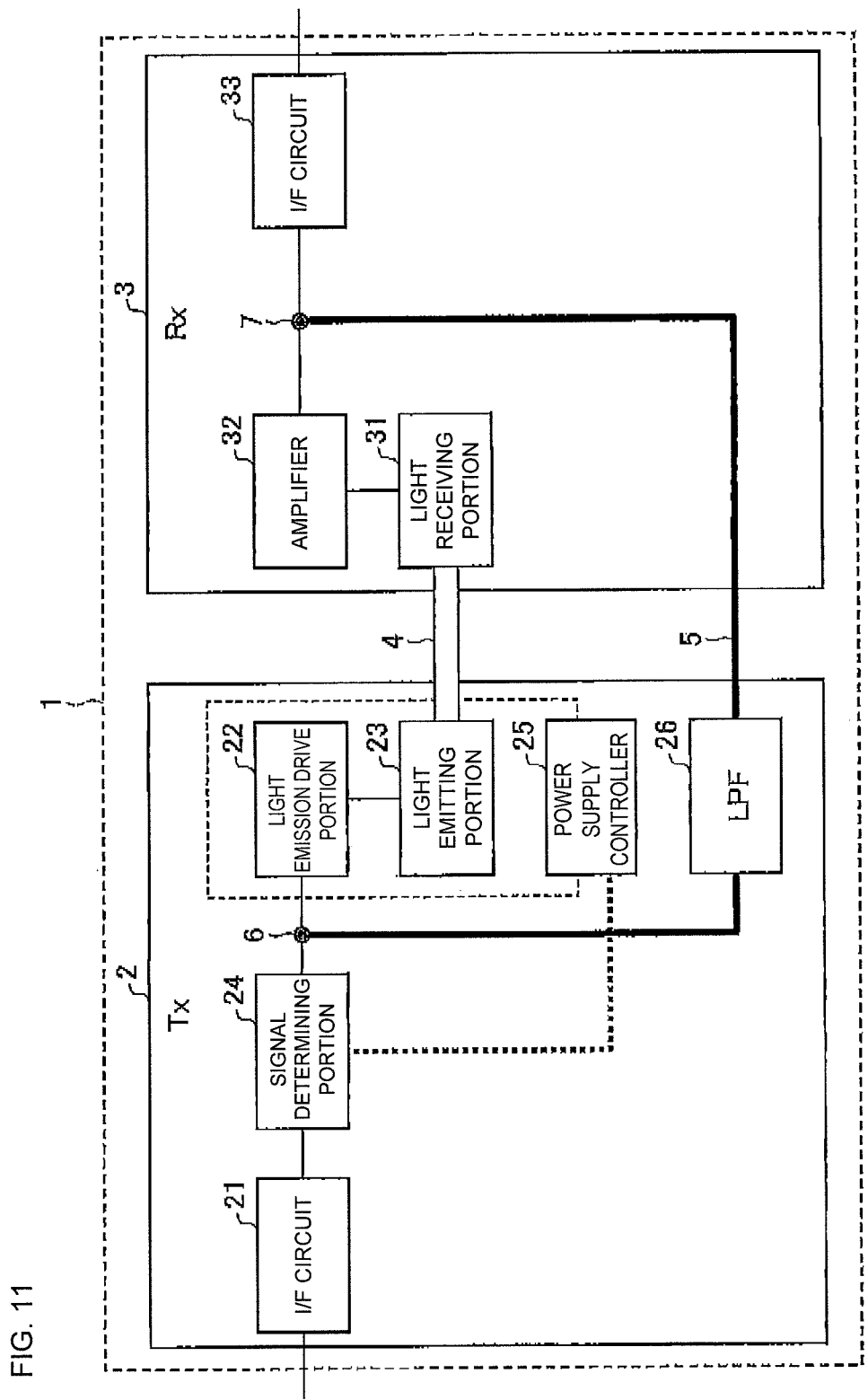
FIG. 11 is a view showing a configuration of the main parts of a light transmission module serving as "variant 1-1-2" according to the present embodiment.

As in the light transmission module 1 shown in FIG. 11, the signal determining portion 24 is arranged between the I/F circuit 21 and the branched portion 6 in the circuit configuration of the light transmission module 1 shown in FIG. 1, and an instruction to start or stop the drive of the power supply controller 25 is made when the electrical signal of low frequency is input.

In other words, when the electrical signal of low frequency is input, the signal determining portion 24 transmits the control signal indicating the stop command of the power supply to the power supply controller 25 and outputs the input electrical signal towards the light emission drive portion 22 and the LPF 26 through the branched portion 6. The power supply to the light emission drive portion 22 and the light emitting portion 23 is stopped by the power supply controller 25 according to the instruction from the signal determining portion 24, and thus the electrical signal towards the light emission drive portion 22 is once interrupted at this point. The electrical signal towards the LPF 26 is passed through the LPF 26, and is output to the light reception processing unit 3 through the electrical transmission path 5.

When the electrical signal of high frequency is input, the signal determining portion 24 outputs the electrical signal as is towards the light emission drive portion 22 and the LPF 26 through the branched portion 6. The electrical signal of high frequency output towards the LPF 26 does not pass the LPF 26, and thus is interrupted at this point. The electrical signal output to the light emission drive portion 22 is converted to an optical signal by the light emitting portion 23 by the control of the light emission drive portion 22. The signal is then output to the light reception processing unit 3 through the light transmission path 4.

(Variant 1-2-1)

Figure 12:
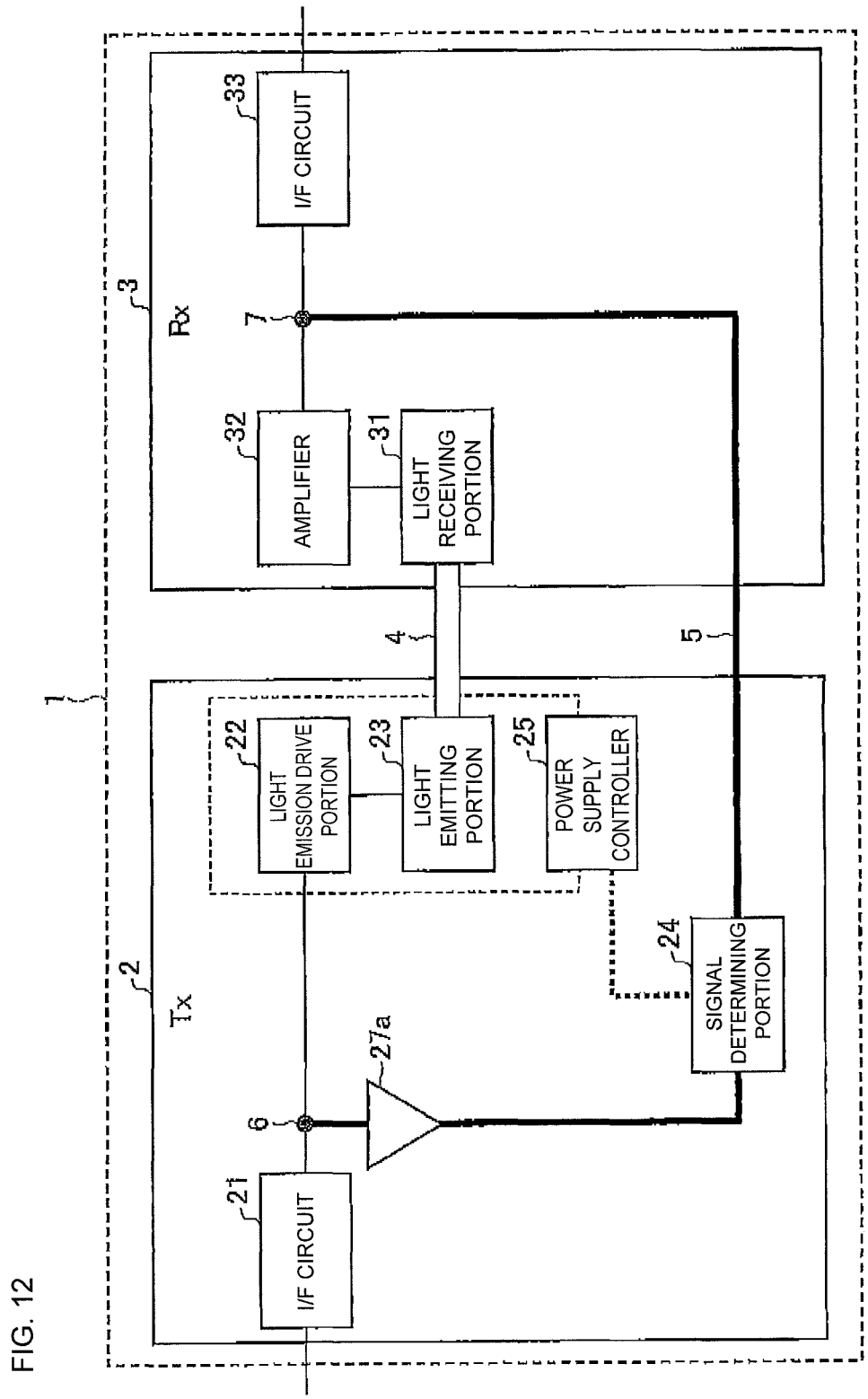
FIG. 12 is a view showing a configuration of the main parts of a light transmission module serving as "variant 1-2-1" according to the present embodiment.

Further a "variant 1-2" of the configuration of the light transmission module 1 according to the present embodiment will be described with reference to FIG. 12. FIG. 12 is a block diagram showing a schematic configuration of the light transmission module 1 serving as a "variant 1-2-1".

In other words, as shown in FIG. 12, a high input impedance circuit 27*a* is further arranged at a connecting portion with the branched portion 6 in the electrical transmission path 5 in the circuit configuration of the light transmission module 1 shown in FIG. 1. The connecting portion with the branched portion 6 is arranged closer to the portion on the light reception processing unit 3 side than the branched portion 6 on the electrical transmission path 5 and near the branched portion 6.

Generally, when transmitting the electrical signal at high speed, the transmitted high frequency signal (RF signal) is likely to be influenced by other circuits, and bluntness occurs in the signal waveform. Thus, a problem in that a so-called impedance matching cannot be realized or in which the signal is not transmitted as a normal signal arises.

In the [variant 1-2-1], the high input impedance circuit 27a is arranged such that the input impedance of the circuit that influences the signal waveform, i.e., the signal determining portion 24 herein becomes high. Therefore, in the light transmission module 1, bluntness of the waveform of the high frequency signal is prevented on the light transmission path 4, and the control signal can be transmitted at high speed as a normal signal.

A specific example of the high input impedance circuit 27a is an inverter circuit that uses a MOS transistor for the input unit.

The high input impedance circuit 27a may also be arranged in the circuit configuration shown in the "variant 1-1-1" and the "variant 1-1-2". When arranging the high input impedance circuit 27a in the circuit configuration shown in the "variant 1-1-1" and the "variant 1-1-2", the high input impedance circuit 27a may be arranged at the connecting portion with the branched portion 6. In other words, the high input impedance circuit 27a is arranged closer to the light reception processing unit 3 side than the branched portion 6 on the electrical transmission path 5 and near the branched portion 6.

(Variant 1-2-2)

Figure 13:
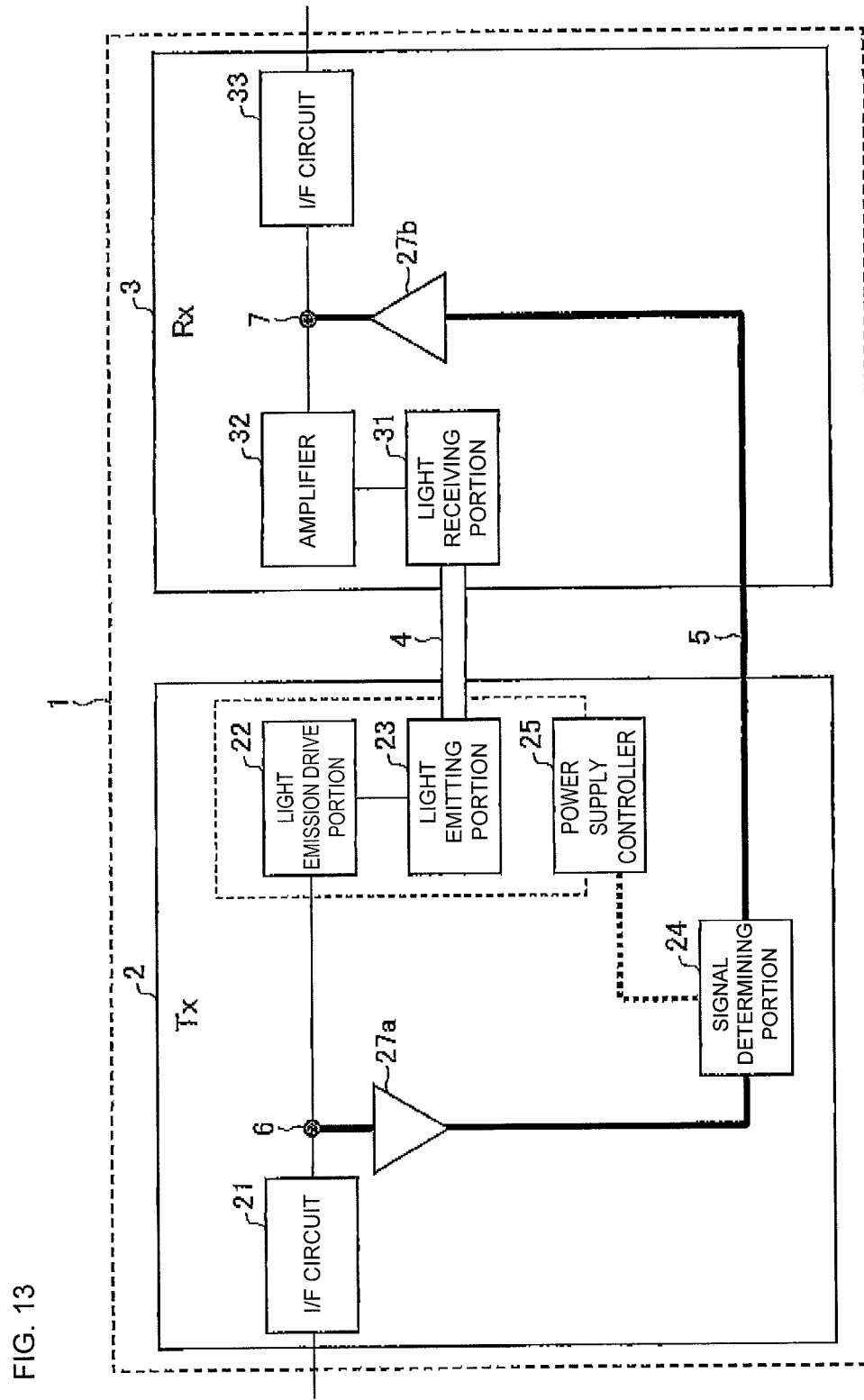
FIG. 13 is a view showing a configuration of the main parts of a light transmission module serving as "variant 1-2-2" according to the present embodiment.

As shown in FIG. 13, the light transmission module 1 may include a high input impedance circuit 27b at the connecting portion with the coupling portion 7 on the electrical transmission path 5 in addition to the high input impedance circuit 27a. The circuit configuration of such light transmission module 1 will be described as a "variant 1-2-2".

In other words, in the "variant 1-2-2" of the light transmission module 1, the high impedance circuit 27b similar to the high input impedance circuit 27a is arranged at the connecting portion with the coupling portion 7, that is, closer to the light transmission processing unit 2 side than the coupling portion 7 on the electrical transmission path 5 and near the coupling portion 7. The signal output to the light reception processing unit 3 through the light transmission path 4 is thus prevented from mixing into the electrical transmission path 5 through the coupling portion 7.

The high input impedance circuit 27b may be further arranged in the circuit configurations shown in the "variant 1-1-1" and the "variant 1-1-2" as well as the configuration in which the high input impedance circuit 27a is arranged in such circuit configurations. That is, the high input impedance circuit 27b is arranged at the connecting portion with the coupling portion 7 in the circuit configurations shown in the "variant 1-1-1" and the "variant 1-1-2" as well as the configuration in which the high input impedance circuit 27a is arranged in such circuits.

(Variant 1-3)

A "variant 1-3" will be described as a further variant of the light transmission module 1 according to the present embodiment with reference to FIG. 14. In other words, the light transmission module in the "variant 1-3" has a configuration of further including a signal reading portion 28 and an open/close circuit 34 in the configuration of the light transmission module 1 shown in FIG. 1.

The signal reading portion 28 checks the information contained in the electrical signal output from the light transmission processing unit 2 to the light reception processing unit 3 through the electrical transmission path 5, and controls the opening and the closing of the open/close circuit 34.

Specifically, the signal reading portion 28 can be realized as below using the flip-flop circuit shown in FIG. 32 or the comparator shown in FIG. 33.

In other words, when the signal reading portion 28 is realized by a flip-flop circuit, a bit "11" is set as a control command at the head and the end of a low frequency signal train and the control command "11" is not set in other portions of the signal train in the light transmission module 1 according to the present embodiment. The control command "11" is not set in the high frequency signal train.

Furthermore, in the flip-flop circuit, the control signal (signal instructing open/close state of circuit) output from the signal reading portion 28 to the open/close circuit 34 is changed when the input control command is "11", and the control signal (instruct open/close state of circuit) is fed back and the state is maintained at times other than when the input control command is "11".

In a state the circuit is opened by the open/close circuit 34, the electrical signal of high frequency is input to the signal reading portion 28 through the electrical transmission path 5. In this case, the flip-flop circuit feeds back and maintains a state of drive instructed by the control command.

When the electrical signal of low frequency is transmitted through the electrical transmission path 5 and input to the signal reading portion 28, the control command "11" set at the head of the signal train is read and the control signal output to the open/close circuit 34 becomes a signal instructing the change of the open/close state of the circuit to close the circuit in the flip-flop circuit. In the flip-flop circuit, while "11" is read as the control command set at the head of the signal train until the command "11" at the end of the signal train is read (period not including "11"), the state of drive instructed by the control signal is fed back and maintained.

When the control command "11" set at the end of the signal train is read, the state where the circuit is closed is changed to a state where the circuit is opened by the control signal. The control command is shown with "11" above, but this is not the sole case, and the change of the open/close state of the circuit can be appropriately set with a configuration set by an arbitrary number of bits of greater than or equal to two bits or a combination thereof.

If the signal reading portion 28 is realized by a comparator, the electrical signal of high frequency is set such that the average potential thereof does not become greater than the reference potential, and the electrical signal of low frequency is set such that the average potential thereof becomes greater than the reference potential in the light transmission module 1 according to the present embodiment. The comparator outputs "0" to the open/close circuit 34 to instruct the opening of the circuit when the average potential of the input electrical signal is not greater than the reference potential.

The comparator outputs "1" to the open/close circuit 34 to instruct the closing of the circuit when the average potential of the input electrical signal is greater than the reference potential. The open/close circuit 34 closes and opens the transmission path in the electrical transmission path 5, that is, disconnects or connects the transmission path according to the instruction from the signal reading portion 28.

In other words, the electrical signal output from the light transmission processing unit 2 to the light reception processing unit 3 may contain information by the signal waveform as described above. When reading the content of the electrical signal transmitted through the electrical transmission path 5 and determining that the electrical signal does not need to be output to the light reception processing unit 3, the signal reading portion 28 opens the open/close circuit 34 and disconnects the electrical transmission path 5. When determining that the information contained in the electrical signal transmitted through the electrical transmission path 5 needs to be output to the light reception processing unit 3, the signal reading portion 28 instructs the open/close circuit 34 to close the open circuit.

The signal transmitted from the light transmission processing unit 2 to the light reception processing unit 3 through the light transmission path 4 and the signal transmitted from the light transmission processing unit 2 to the light reception processing unit 3 through the electrical transmission path 5 are thus prevented from interfering after the connecting portion 7. For instance, when an electrical signal occurs as noise through the electrical transmission path 5 in a state the signal is output from the light transmission processing unit 2 to the light reception processing unit 3 through the light transmission path 4, the electrical signal is prevented from being input to the connecting portion 7 and interfering.

Figure 14:
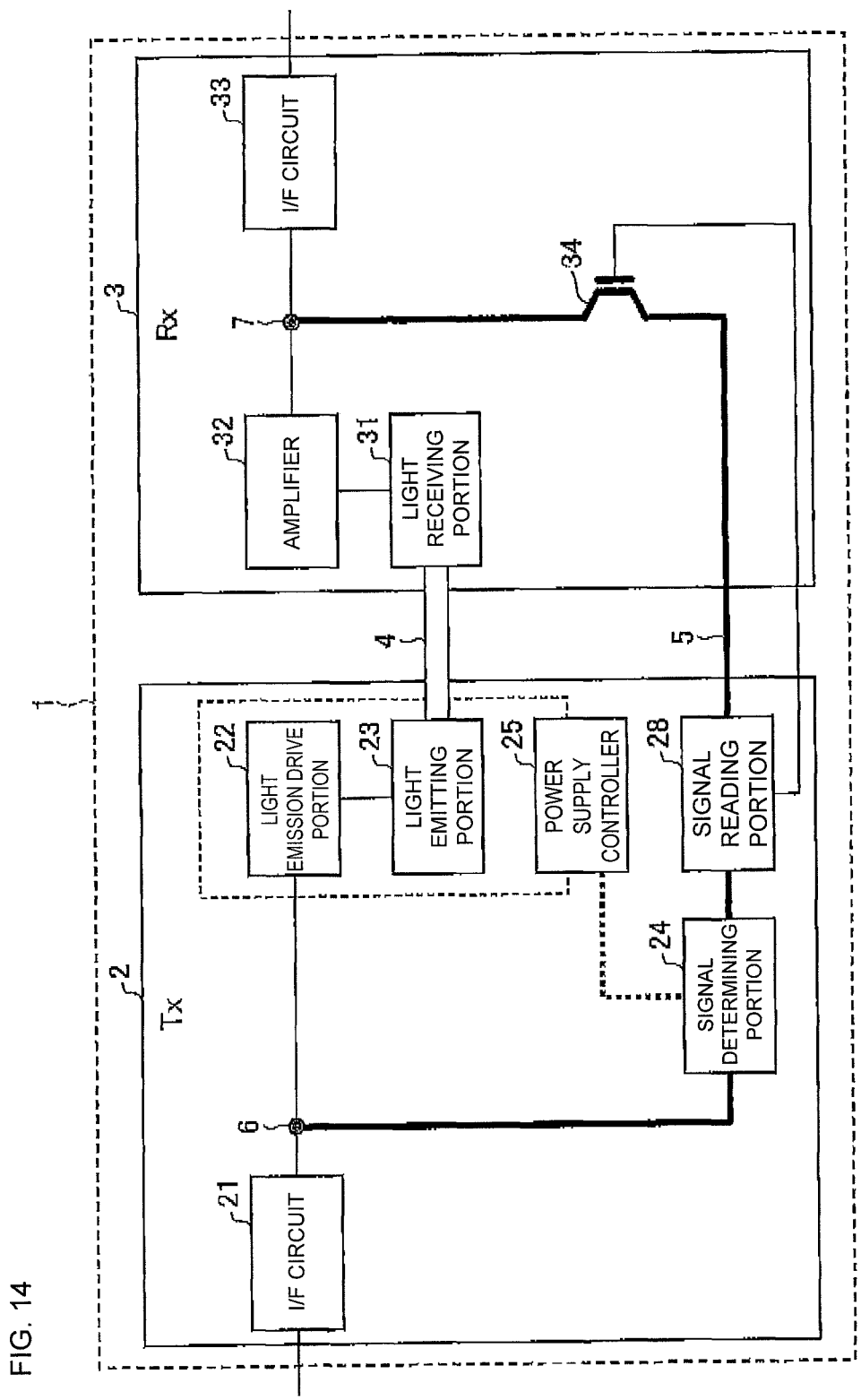
FIG. 14 is a view showing a configuration of the main parts of a light transmission module serving as "variant 1-3" according to the present embodiment.

In FIG. 14, the signal reading portion 28 is arranged on the light transmission processing unit 2 side, and the open/close circuit 34 is arranged on the light reception processing unit 3 side, but this is not the sole case. Both portions may be arranged on the light transmission processing unit 2 or may be arranged on the light reception processing unit 3.

The signal reading portion 28 has a configuration of being arranged on the electrical transmission path 5, but may be arranged closer to the I/F circuit 33 side than the connecting portion 7. If the signal reading portion 28 is arranged closer to the I/F circuit 33 side than the connecting portion 7, the signal reading portion 28 reads the signal to be input to the I/F circuit 33 and checks whether interference has occurred in the signal. When determined that interference has occurred in the signal, the electrical transmission path 5 is disconnected by the open/close circuit 34 to prevent interference.

(Variant 1-4-1)

Figure 15:
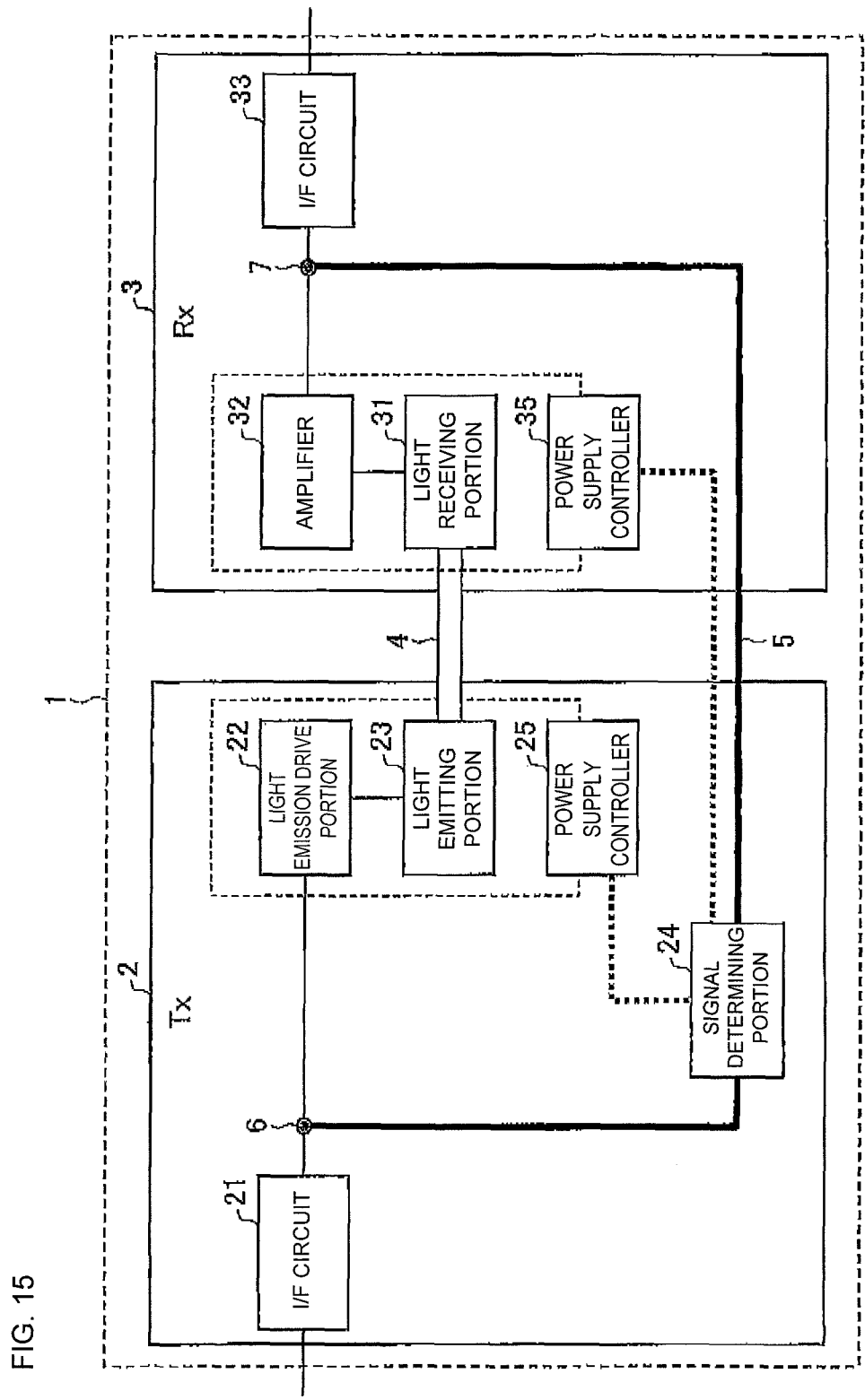
FIG. 15 is a view showing a configuration of the main parts of a light transmission module serving as "variant 1-4-1" according to the present embodiment.

The control of drive such as start or stop of the power supply controller 25 is performed by the control signal from the signal determining portion 24 in the light transmission module 1 according to the present embodiment, but this is not the sole case. As shown in FIG. 15, a configuration in which a power supply controller 35 is further arranged on the light reception processing unit 3 side and the control signal output from the signal determining portion 24 is transmitted to the power supply controller 25 and the power supply controller 35 may be adopted as a "variant 1-4-1".

In such configuration, when the electrical signal of low frequency is input to the electrical transmission path 5, the signal determining portion 24 transmits the control signal indicating stop to the power supply controller 25 and the power supply controller 35 in the light transmission module 1. The power supply controller 25 stops the power supply to the light emission drive portion 22 and the light emitting portion 23 and the power supply controller 35 stops the power supply to the light receiving portion 31 and the amplifier 32 in response to the control signal from the signal determining portion 24.

In the light transmission module 1, the electrical signal to be transmitted at low speed is prevented from being light-transmitted by mistake, and the power supply to the light emission drive portion 22, the light emitting portion 23, the light receiving portion 31, and the amplifier 32 can be stopped when not light-transmitting the electrical signal. The power consumption in the light transmission module 1 thus can be reduced.

(Variant 1-4-2)

Figure 16:
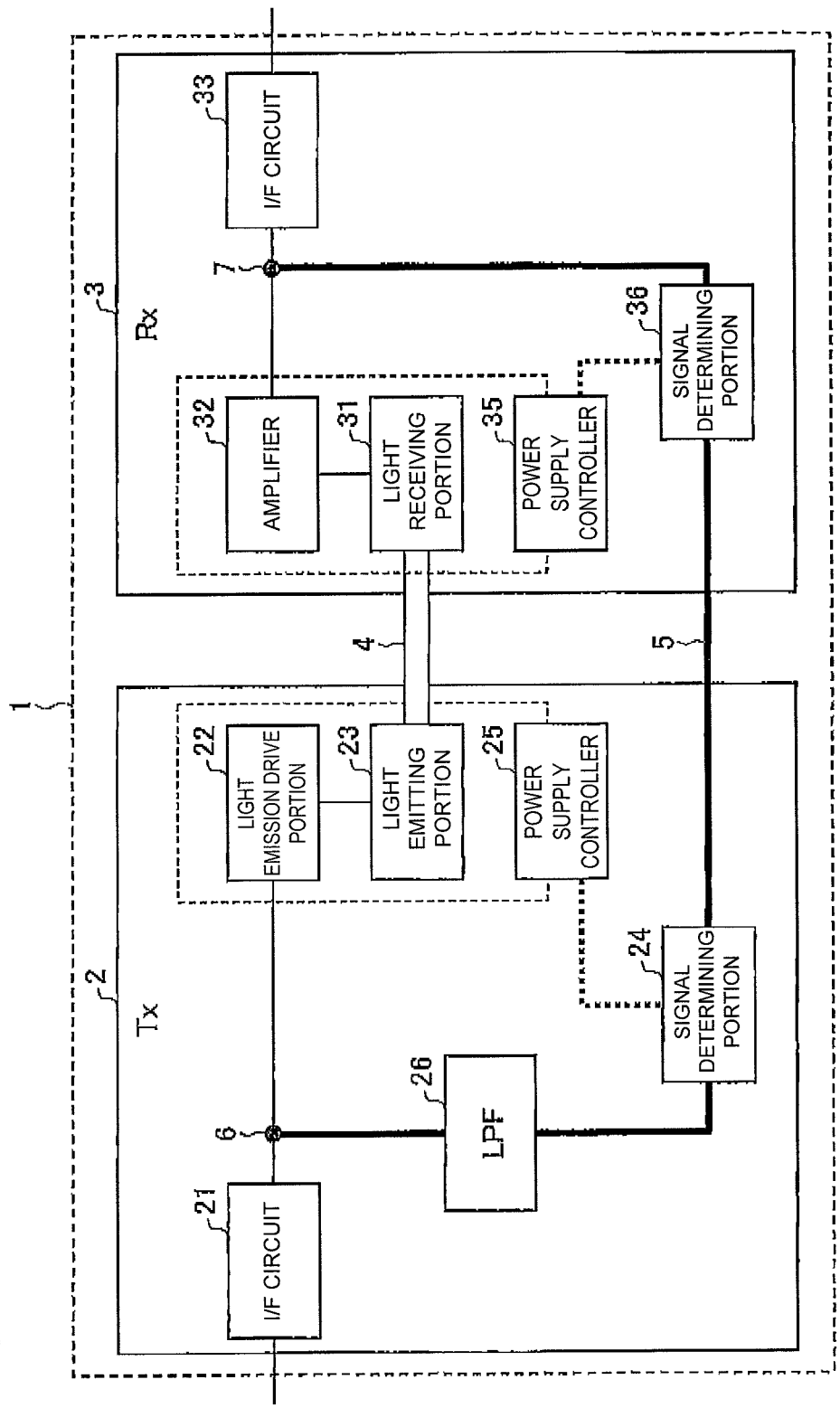
FIG. 16 is a view showing a configuration of the main parts of a light transmission module serving as "variant 1-4-2" according to the present embodiment.

Furthermore, the light transmission module 1 may have a configuration in which the light reception processing unit 3 includes a signal determining portion 36 functioning similar to the signal determining portion 24 in the configuration shown in the "variant 1-1-1" shown in FIG. 16 as a "variant 1-4-2".

In the case of the configuration shown in the "variant 1-4-2", the signal determining portion 36 determines only the presence of the input of the electrical signal, and transmits the control signal indicating the stop command to the power supply controller 35 when determined that the input of the electrical signal is present.

Thus, in the light transmission module 1 according to the "variant 1-4-2", the electrical signal to be transmitted at low speed is prevented from being light-transmitted by mistake, and the power supply to the light emission drive portion 22, the light emitting portion 23, the light receiving portion 31, and the amplifier 32 can be stopped when not light-transmitting the electrical signal. The power consumption in the light transmission module 1 thus can be reduced.

Furthermore, in such configuration, the circuit configuration of each of the signal determining portion 24 and the signal determining portion 36 becomes simpler than the signal determining portion 24 of the light transmission module 1 shown in FIG. 1.

In the light transmission module 1 described above, a configuration in which the signal is output in one direction from the light transmission processing unit 2 to the light reception processing unit 3 has been described above, but a configuration in which a signal is transmitted and received bi-directionally between the light transmission processing unit 2 and the light reception processing unit 3 can be adopted.

(Variant 2-1)

A configuration in which the signal is transmitted and received bi-directionally between the light transmission processing unit 2 and the light reception processing unit 3 will be described below with reference to FIG. 17 as a "variant 2-1".

In other words, in the light transmission module 1 shown as the "variant 2-1", a light transmission processing unit 52 further includes the light receiving portion 31, the amplifier 32, the I/F circuit 33, and the coupling portion 7 arranged in the light reception processing unit 3 in the configuration shown in FIG. 1, and a light reception processing unit 53 further includes the I/F circuit 21, the light emission drive portion 22, the light emitting portion 23, and the branched portion 6 arranged in the light transmission processing unit 2 in the configuration shown in FIG. 1. The light transmission path 4 for transmitting the optical signal from the light reception processing unit 53 to the light transmission processing unit 52, and an electrical transmission path 5 for transmitting the electrical signal are further arranged between the light transmission processing unit 52 and the light reception processing unit 53.

Figure 17:
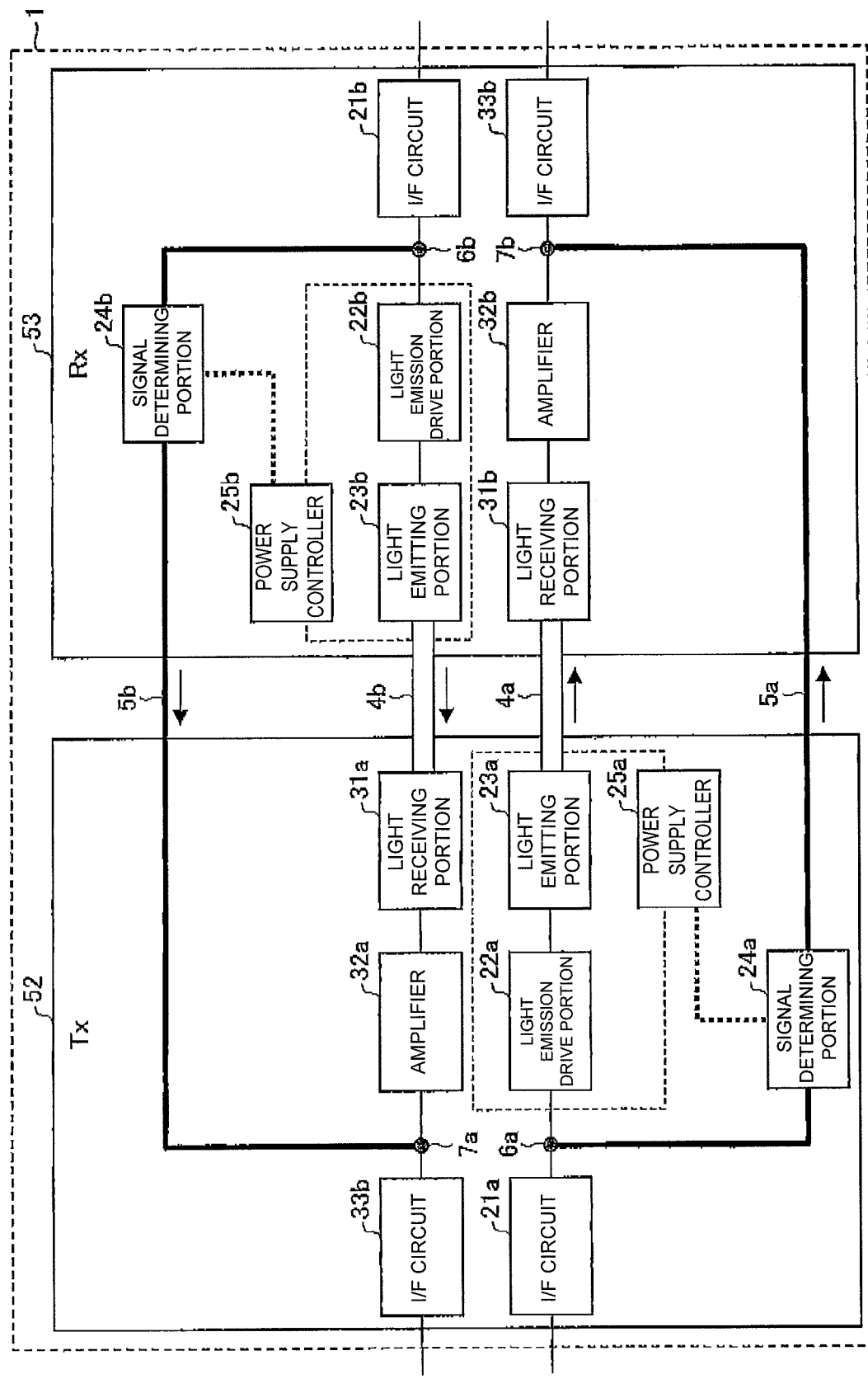
FIG. 17 is a view showing a configuration of the main parts of a light transmission module serving as "variant 2-1" according to the present embodiment.

A subscript "a" is given to the reference number of each portion of the light transmission processing unit 52, and a subscript "b" is given to the reference number of each portion of the light reception processing unit 53 in FIG. 17 to distinguish each portion of the light transmission processing unit 52 and each portion of the light reception processing unit 53. The newly arranged light transmission path is denoted as the light transmission path 4b and the electrical transmission path as the electrical transmission path 5b, and the light transmission path already arranged in the configuration shown in FIG.

1 as the light transmission path 4α and the electrical transmission path as the electrical transmission path 5a to distinguish each transmission path.

Each newly arranged portion in the light transmission processing unit 52 and the light reception processing unit 53 has been previously described, and thus the details thereof will not be given.

Therefore, in the light transmission module 1, the signals can be bi-directionally transmitted between the light transmission processing unit 52 and the light reception processing unit 53.

Furthermore, since the light transmission processing unit 52 includes the signal determining portion 24α, only the electrical signal of high frequency is converted to the optical signal and transmitted to the light reception processing unit 53. Since the light reception processing unit 53 includes the signal determining portion 24b, only the electrical signal of high frequency is converted to the optical signal and transmitted to the light transmission processing unit 52.

The signal determining portions 24α, 24b can be configured by a logical circuit that performs a simple determination on whether the input of the electrical signal of high frequency is made or whether the input of the electrical signal of low frequency is made. Thus, as a configuration of light-transmitting only the electrical signal of high frequency, a configuration in which the HPF for passing only the electrical signal of high frequency is arranged so that only the electrical signal that becomes high frequency is input to the light emission drive portion 22a or the light emission drive portion 22b is considered, but the present application has a simpler and smaller circuit configuration than such configuration.

The light transmission module 1 described above has a configuration of bi-directionally transmitting signals, and the variants 1-1-1, 1-1-2, 1-2-1, 1-2-2, or 1-3 are realized by further arranging the LPF 26, the high input impedance circuit 27, or the signal reading portion 28 in the light reception processing unit 53, and further arranging the open/close circuit 34 or the power supply controller 35 and the signal determining portion 36 in the light transmission processing unit 52 even when the signal is transmitted from the light reception processing unit 53 to the light transmission processing unit 52.

Figure 27:
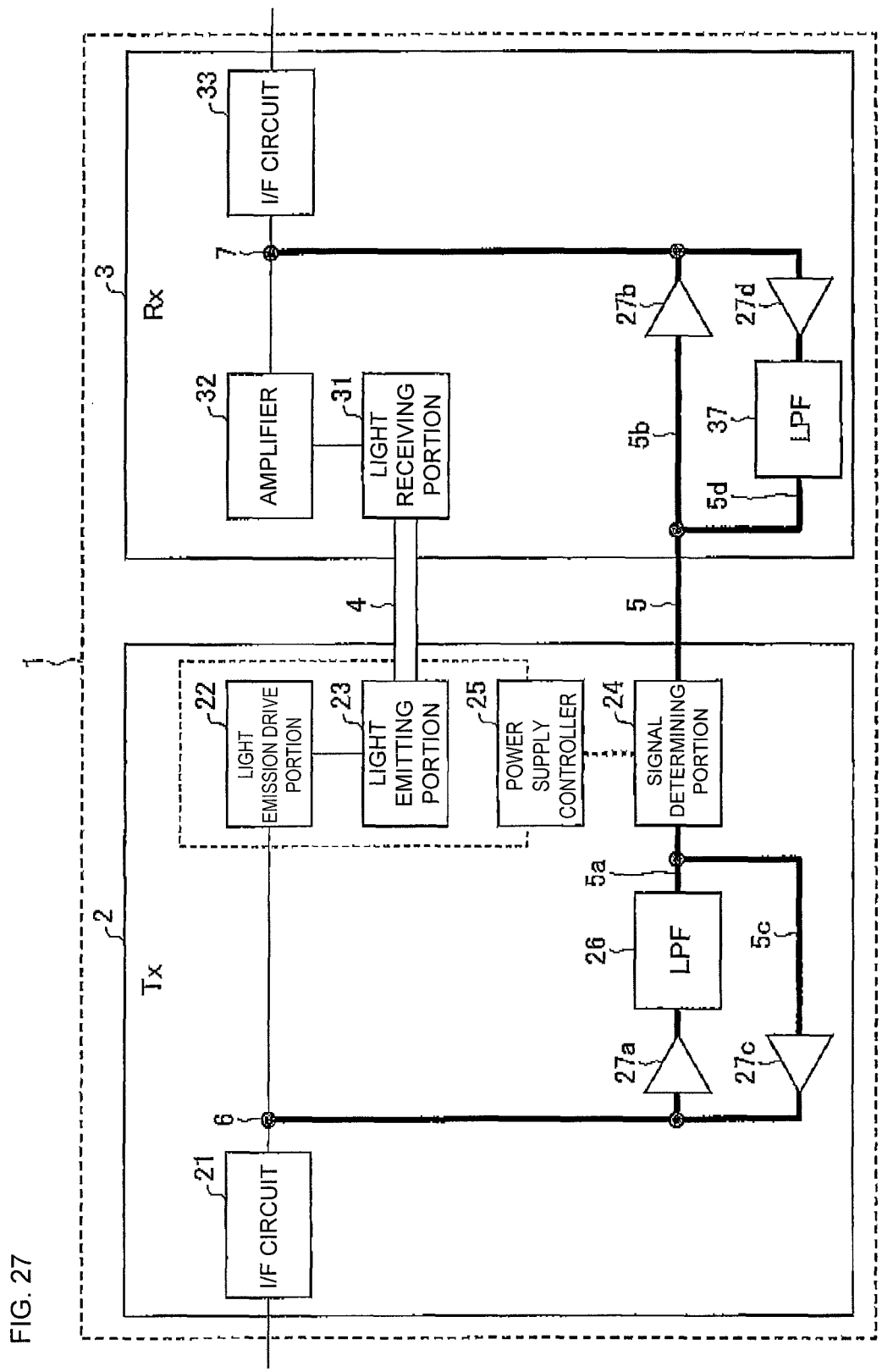
FIG. 27 is a view showing a configuration of the main parts of the light transmission module serving as a "variant 3-1" according to the present embodiment.

Moreover, in the light transmission module 1, a configuration of bi-directionally transmitting the electrical signals is obtained as a "variant 3-1" by configuring the electrical transmission path 5 shown in FIG. 17 as in FIG. 27.

(Variant 3-1)

In other words, in the configuration of the light transmission module 1 (see FIG. 13) shown as the "variant 1-2-2", the electrical transmission path 5 further includes an LPF 26 between the high input impedance circuit 27a and the signal determining portion 24. In such circuit configuration, the electrical transmission path for connecting the branched portion 6 and the signal determining portion 24 and the electrical transmission path for connecting the signal determining portion 24 and the coupling portion 7 are further arranged.

For the sake of convenience of explanation, in the electrical transmission path 5 with the high input impedance circuit 27a, the LPF 26, the signal determining portion 24, and the high input impedance circuit 27b in order from the branched portion 6 to the coupling portion 7, the path between the branched portion 6 to the signal determining portion 24 is referred to as the electrical transmission path 5a and the path from the signal determining portion 24 to the coupling portion is referred to as the electrical transmission path 5b. The electrical transmission path for connecting the branched portion 6 and the signal determining portion 24 is referred to as an electrical transmission path 5c, and the electrical transmission path for connecting the signal determining portion 24 and the coupling portion 7 is referred to as an electrical transmission path 5d.

The electrical transmission path 5c includes a high input impedance circuit 27c for accepting only the input of the electrical signal transmitted from the signal determining portion 24 towards the branched portion 6, and the electrical transmission path 5d includes a high input impedance circuit 27d and an LPF 37 for accepting only the input of the electrical signal transmitted from the coupling portion 7 towards the signal determining portion 24. In other words, the high input impedance circuits 27a to 27d are arranged so that the electrical signal is transmitted from the branched portion 6 towards the coupling portion 7 in the electrical transmission paths 5a, 5b, and the electrical signal is transmitted from the coupling portion 7 towards the branched portion 6 in the electrical transmission paths 5b, 5d.

That is, the electrical transmission path 5 is designed as below in the light transmission module 1.

In other words, the electrical transmission path 5 includes the electrical transmission path 5a for transmitting the electrical signal in order of the high input impedance circuit 27a and the LPF 26 from the branched portion 6 towards the signal determining portion 24, and the electrical transmission path 5c connecting the branched portion 6 and the signal determining portion 24 for transmitting the electrical signal in the opposite direction to the electrical transmission path 5a. The electrical transmission path 5c can be transmitted with only the electrical signal in the opposite direction to the electrical signal transmitted through the electrical transmission path 5a, and includes the high input impedance circuit 27c functioning so that the light transmission path 4 is segmentalized from the electrical transmission path 5c by high impedance.

The light transmission module 1 includes the electrical transmission path 5b for transmitting the electrical signal from the signal determining portion 24 towards the coupling portion 7, and the electrical transmission path 5d, connecting the signal determining portion 24 and the coupling portion 7, for transmitting the electrical signal in the opposite direction to the electrical transmission path 5b through the high input impedance circuit 27b.

The electrical transmission path 5d can be transmitted with only the electrical signal in the opposite direction to the electrical signal transmitted through the electrical transmission path 5b, and includes the high input impedance circuit 27d functioning so that the light transmission path 4 is segmentalized from the electrical transmission path 5d by high impedance and another LPF 37 for passing the low frequency electrical signal of the electrical signals output from the high input impedance circuit 27d and outputting the low frequency electrical signal to the signal determining portion 24.

According to the above configuration, in the electrical transmission path 5, only the electrical signal other than a predetermined frequency is transmitted from the branched portion 6 towards the coupling portion 7 by the electrical transmission path 5a and the electrical transmission path 5b. Furthermore, influence on the signal transmitted through the light transmission path 4 is prevented since the high input impedance circuit 27a and the high input impedance circuit 27b are arranged on the electrical transmission path 5a and the electrical transmission path 5c.

The electrical transmission path 5c includes the high input impedance circuit 27c between the branched portion 6 and the signal determining portion 24. The electrical transmission path 5d includes the high input impedance circuit 27d and another LPF 37 between the signal determining portion 24 and the coupling portion 7.

Therefore, in the electrical transmission path 5, the electrical signal of low frequency is transmitted from the coupling portion 7 towards the branched portion 6 by the electrical transmission path 5c and the electrical transmission path 5d. Furthermore, influence on the signal transmitted through the light transmission path 4 is prevented since the high input impedance circuit 27c and the high input impedance circuit 27d are arranged on the electrical transmission path 5c and the electrical transmission path 5d.

According to such configuration, the light transmission module 1 can realize bi-directional transmission of electrical signals such as transmitting the electrical signal that becomes low frequency from the branched portion 6 towards the coupling portion 7 and transmitting the electrical signal that becomes low frequency from the coupling portion 7 towards the branched portion 6 on the electrical transmission path 5.

In the variants "1-1-1", "1-1-2", and "3-1", the LPF 26 or the LP 37 is arranged. However, a filter for determining the passing of the electrical signal according to the magnitude of the amplitude of the input electrical signal may be arranged in place of such LPF 26, 37.

In other words, in the light transmission module 1, the signal of high frequency is transmitted at a voltage smaller than that of the signal of low frequency, and whether or not the input signal is a signal of high frequency is determined by whether the amplitude of the input signal is lower or higher than the amplitude that becomes a reference.

(Attachment Method to Wiring Substrate)

The attachment method of attaching the light transmission module 1 to an external wiring substrate 15 will be described. The method of attaching the light transmission module 1 to the external wiring substrate 15 includes a so-called perpendicular connection method of fitting and attaching an end of the light transmission module 1 to a connection holding member 13 arranged on the external wiring substrate 15 so as to be substantially perpendicular to the upper surface of the external wiring substrate 15.

Another attachment method includes a so-called horizontal connection method of sliding and attaching the end face of the light transmission module 1 to the connection holding member 13 arranged on the external wiring substrate 15 so as to be substantially parallel to the upper surface of the external wiring substrate 15.

Figure 18:
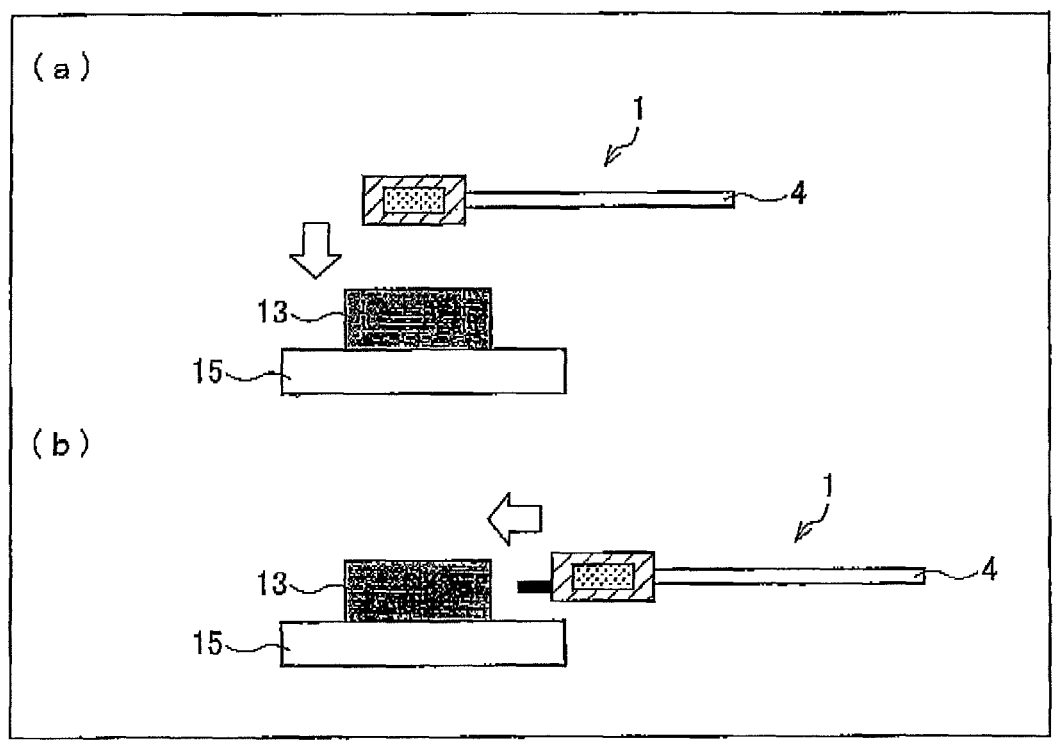
FIG. 18 is a view showing an attachment method of attaching the light transmission module to the external wiring substrate, where FIGS. 18(a) and (b) are cross-sectional views showing an arrangement relationship of the light transmission module, the external wiring substrate, and the connection holding member.
Figure 19:
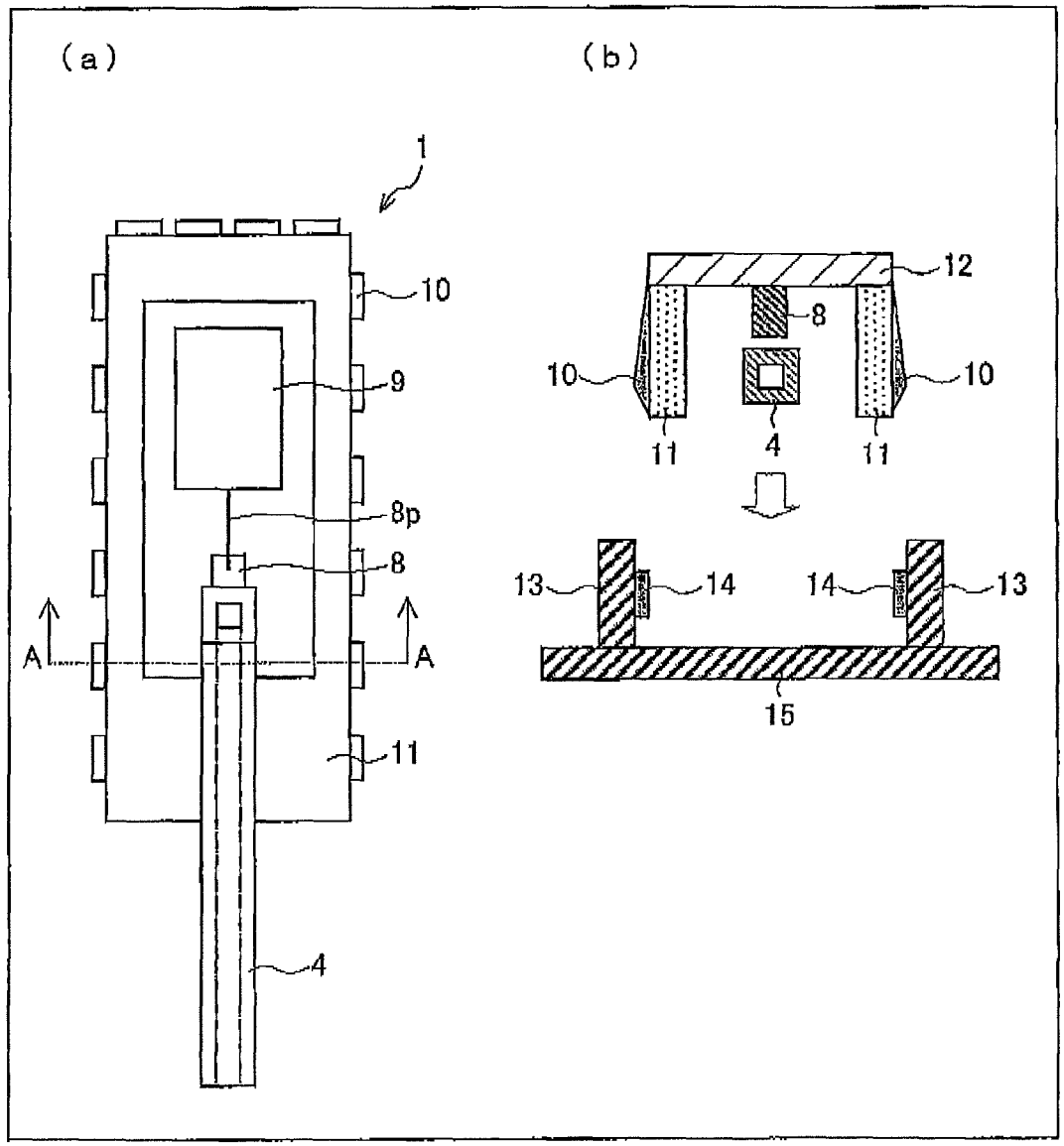
FIG. 19(a) is a plan view showing a schematic configuration of the light transmission module in which an electrical connecting portion is arranged on the outer side surface of a height compensation member.
FIG. 19(b) is a cross-sectional view taken along the line A-A of FIG. 19(a), and is a cross-sectional view of the external wiring substrate removably connected to the light transmission module.

FIG. 18 is a view showing the attachment method of attaching the light transmission module 1 to the external wiring substrate 15. FIGS. 18(a) and (b) are cross-sectional views showing an arrangement relationship of the light transmission module 1, the external wiring substrate 15, and the connection holding member 13.

The attachment method of attaching the light transmission module 1 to the external wiring substrate 15 through the perpendicular connection method will be described in detail below with reference to FIG. 19(a) and FIG. 19(b). FIG. 19(a) is a plan view showing a schematic configuration of the light transmission module 1 in which an electrical connecting portion 10 is arranged on the outer side surface of a height compensation member 11. FIG. 19(b) is a cross-sectional view taken along the line A-A of FIG. 19(a), and is a cross-sectional view of the external wiring substrate 15 removably connected to the light transmission module 1.

As shown in FIG. 19(a) and FIG. 19(b), both end faces of the light transmission module 1 are configured to include a light emitting and receiving element portion 8, an electrical wiring 9, an electrical connecting portion 10, a wire 8p, and the height compensation member 11 on the substrate 12.

The substrate 12 is provided to mount the light transmission path 4, the light emitting and receiving element portion 8, the electrical wiring 9, the electrical connecting portion 10, and the height compensation member 11.

The light emitting and receiving element portion 8 is configured by the light emitting portion 23 for converting an electrical signal to an optical signal, and the light receiving portion 31 for converting an optical signal to an electrical signal, and emits and receives the optical signal from the surface on the opposite side from the mounting surface to be mounted on the substrate 12.

The electrical wiring 9 connects each portion of the light transmission processing unit 2 or the light reception processing unit 3 such as the I/F circuit 21, the light emitting portion 23, the light emission drive portion 22, the power supply controller 25, and the signal determining portion 24, or the light receiving portion 31, the amplifier 32, and the I/F circuit 33, and transmits electrical signals. Specifically, the electrical wiring 9 includes a flexible printed circuit board (FPC), a coaxial cable, a lead frame, or the like, for example.

The electrical connecting portion 10 electrically connects the light emitting and receiving element portion 8 and the light emission drive portion 22 and the amplifier 32 by way of the electrical wiring 9. Specifically, the electrical connecting portion 10 includes an electrical connector, thermo-compression bonding connector, and the like, for example.

The light emitting and receiving element portion 8 and the electrical wiring 9 are electrically connected by the wire 8p formed by wire bonding. The number of wires 8p to arrange may be one or may be plurals.

The height compensation member 11 is a holding member for mounting the light transmission path 4 and for maintaining the distance between the light transmission path 4 and the light emitting and receiving element portion 8 constant. The height of the height compensation member 11 is set in advance such that the light coupling efficiency of the light transmission path 4 and the light emitting and receiving element portion 8 becomes optimum.

In the configuration shown in FIG. 19(a) and FIG. 19(b), a plurality of electrical connecting portions 10 . . . is arranged on the outer side surface of the height compensation member 11, that is, the surface on the opposite side with the surface on the side surrounding the light emitting and receiving element portion 8 and the electrical wiring 9, of the surface perpendicular to the surface of the substrate 12, the surface being the input/output end face that enables electrical connection with the external wiring substrate 15.

Each electrical wiring portion 10 is electrically connected to the electrical wiring 9 through a wiring (not shown). All the electrical connecting portions 10 do not need to be electrically connected to the electrical wiring 9, and at least one electrical connecting portion 10 merely needs to be electrically connected to the electrical wiring 9, as needed.

According to such configuration, removable connection with the external wiring substrate 15 arranged with the electrical connecting portion 14 provided to face the electrical connecting portion 10 arranged on the outer side surface of the height compensation member 11 becomes possible.

In other words, a connection holding member 13 having a side surface perpendicular to the surface is arranged on the surface of the external wiring substrate 15 for attaching the light transmission module 1. The connection holding member 13 has a shape of surrounding the outer side surface of the height compensation member 11 of the light transmission module 1 while being connected to the light transmission module 1. The electrical connecting portions 14 . . . are arranged on the surface facing the outer side surface of the height compensation member 11 with connected to the light transmission module 1 of the side surface of the connection holding member 13. Each electrical connecting portion 14 is arranged at a position corresponding to each electrical connecting portion 10 with connected to the light transmission module 1.

According to such configuration, the external wiring substrate 15 and the light transmission module 1 are approached in the direction the respective substrate surfaces face each other to be electrically connected, and separated in the opposite direction to be disconnected.

In other words, the light transmission module 1 includes the electrical connecting portion 10 and the connection holding member 13 arranged on the surface of the external wiring substrate 15 includes the electrical connecting portion 14 to facilitate the connection of the light transmission module 1 and the external wiring substrate 15.

If the electrical connecting portion 10 has a structure with elasticity, and the electrical connecting portion 10 pushes the electrical connecting portion 14 by elasticity while the external wiring substrate 15 and the light transmission module 1 are connected, the connection state thereof can be maintained by the pushing force from the elasticity. The attachment and detachment of the external wiring substrate 15 and the light transmission module 1 thus can be performed very easily.

Therefore, since the external wiring substrate 15 and the light transmission module 1 are easily connected, the light transmission module 1 can be easily and conveniently mounted on the external wiring substrate 15.

Figure 20:
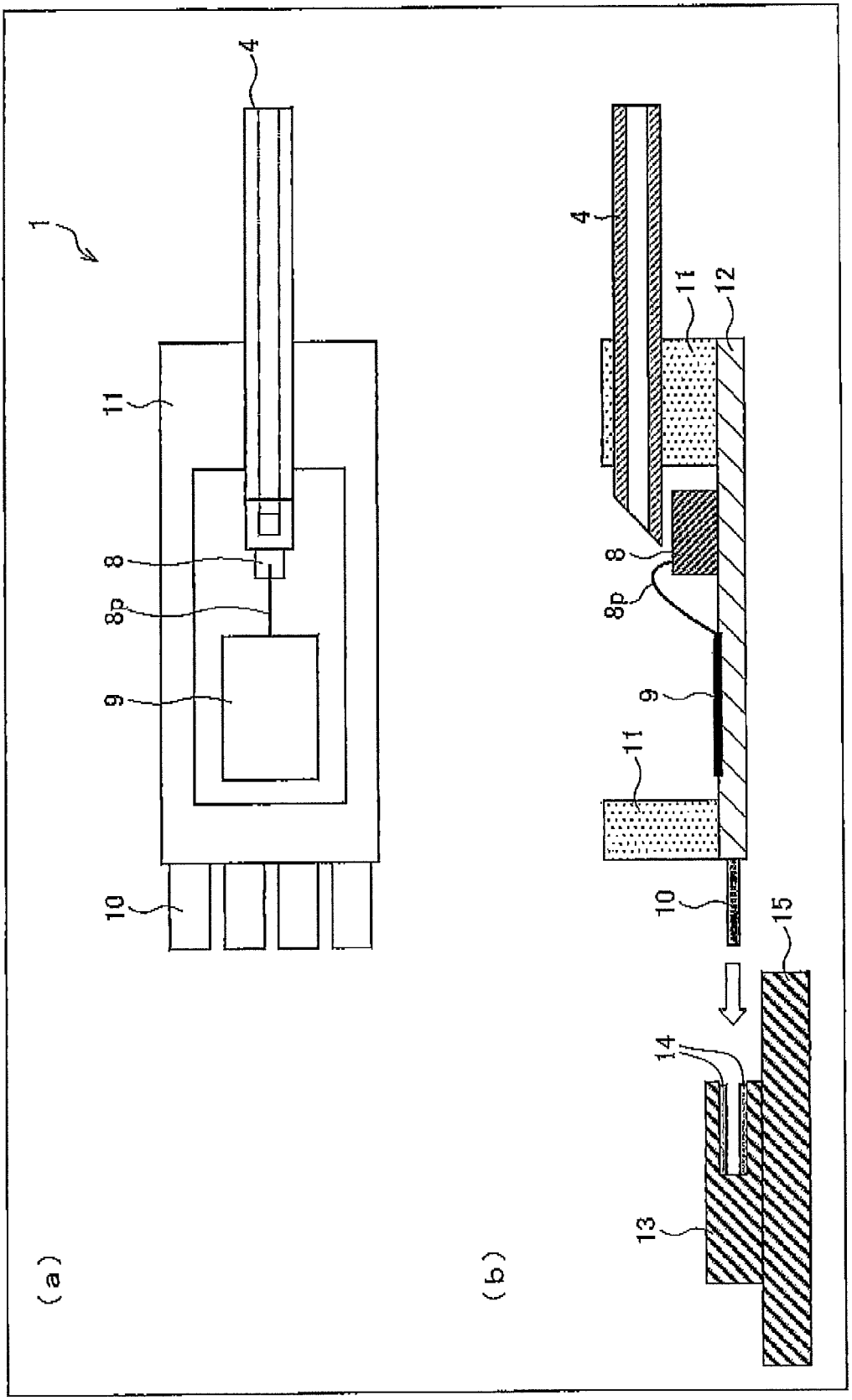
FIG. 20(a) is a plan view showing a schematic configuration of the light transmission module in which the electrical connecting portion is arranged in a form of projecting out in a direction parallel to the surface of the substrate.
FIG. 20(b) is a side cross-sectional view thereof.

The attachment method of attaching the light transmission module 1 to the external wiring substrate 15 by the horizontal connection method will be described in detail below with reference to FIG. 20(*a*) and FIG. 20(*b*). FIG. 20(*a*) is a plan view showing a schematic configuration of the light transmission module 1 in which the electrical connecting portion 10 is arranged in a form of projecting out in a direction parallel to the surface of the substrate 12, and FIG. 20(*b*) is a side cross-sectional view thereof. In the configuration shown in the figure, the electrical connecting portion 10 of a shape projecting out in a direction parallel to the substrate surface is arranged from the side surface perpendicular to the substrate surface of the substrate 12. More specifically, four electrical connecting portions 10 . . . are arranged on the side surface facing the side surface on the side mounted with the light transmission path 4 of the four side surfaces of the substrate 12.

Each electrical connecting portion 10 is electrically connected to the electrical wiring 9 by way of the wiring (not shown). All electrical connecting portions 10 do not need to be electrically connected to the electrical wiring 9, and at least one electrical connecting portion 10 merely needs to be electrically connected to the electrical wiring 9, as needed.

According to such configuration, removable connection with the external wiring substrate 15 arranged with the electrical connecting portion 14 so as to sandwich the electrical connecting portion 10 projecting out in a direction parallel to the substrate surface becomes possible. As shown in FIG. 20(*b*), the connection holding member 13 is arranged on the surface of the external wiring substrate 15. The connection holding member 13 includes a recess having a shape for receiving the insertion of the electrical connecting portion 10 from a direction parallel to the substrate surface, where the electrical connecting portions 14 . . . are arranged on the upper surface and the lower surface of the recess. Each electrical connecting portion 14 is arranged at a position corresponding to each electrical connecting portion 10 with connected to the light transmission module 1 to thereby enable conduction.

According to such configuration, the external wiring substrate 15 and the light transmission module 1 are approached in the direction parallel to the respective substrates surfaces to be electrically connected, and separated in the opposite direction to be disconnected. If the electrical connecting portion 14 has a structure with elasticity, and the electrical connecting portion 14 pushes the electrical connecting portion 10 by elasticity while the external wiring substrate 15 and the light transmission module 1 are connected, the connection state thereof can be maintained by the pushing force from the elasticity. The attachment and detachment of the external wiring substrate 15 and the light transmission module 1 thus can be performed very easily.

The mounting of the light transmission module 1 to the external wiring substrate 15 can be simplified by having the electrical connecting portion 10 as an electrical connector or a thermo-compression bonding connector, and integrally forming the light transmission processing unit 2, 52 and the light reception processing unit 3, 53.

In the perpendicular connection method and the horizontal connection method, one light transmission path 4 has been centrally described for the sake of convenience of explanation. However, in the light transmission module 1 according to the present embodiment, the electrical transmission path 5 is arranged in parallel to the light transmission path. The wiring method for wiring both the light transmission path 4 and the electrical transmission path 5 will be described.

The wiring method may be a parallel wiring, a two-story wiring, or an integrated wiring in each of the perpendicular connection method and the horizontal connection method.

Figure 26:
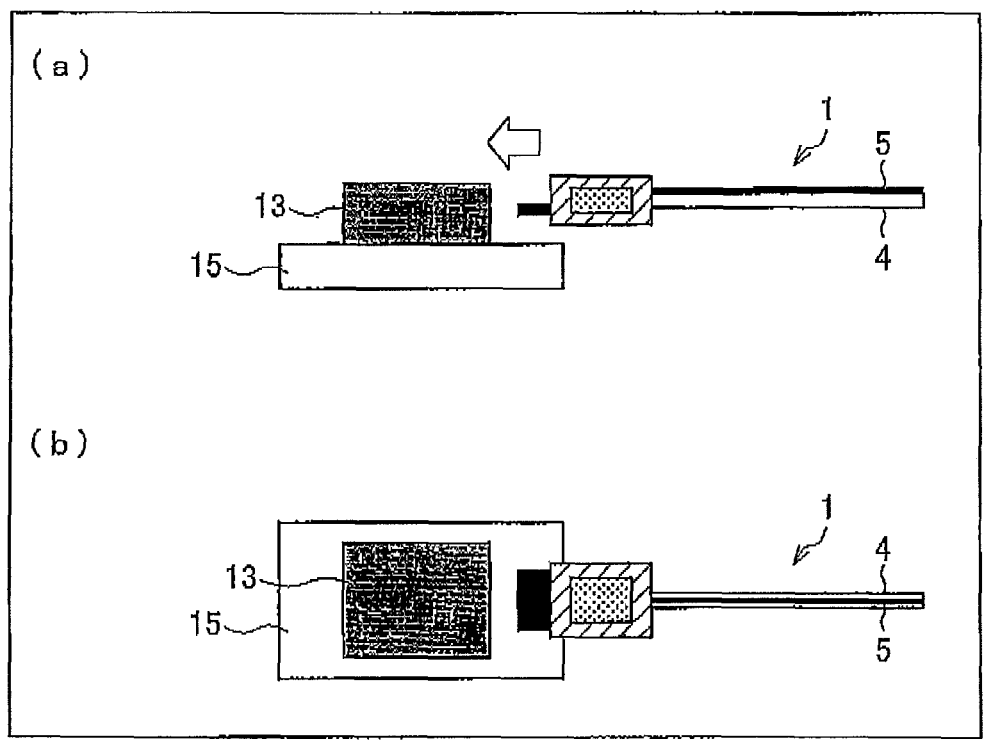
FIG. 26 is a view showing a case where the two transmission paths of the light transmission module are integrally wired, and connection is carried out by the horizontal connection method, where

The parallel wiring, the two-story wiring, and the integrated wiring will be described with reference to FIGS. 21(*a*), 21(*b*) to FIGS. 26(*a*), 26(*b*).

Figure 21:
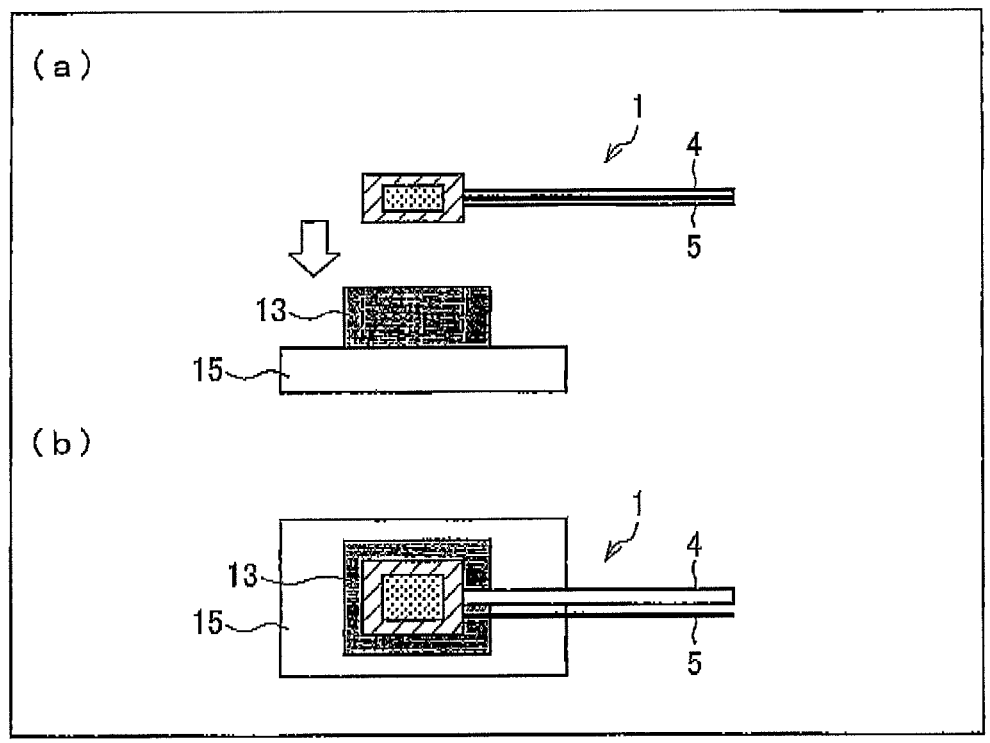
FIG. 21 is a view showing a case where the light transmission path and the electrical transmission path of the light transmission module are wired in parallel such that an equal distance is obtained with respect to the upper surface of the external wiring substrate, and connection is carried out by the perpendicular connection method, where
Figure 22:
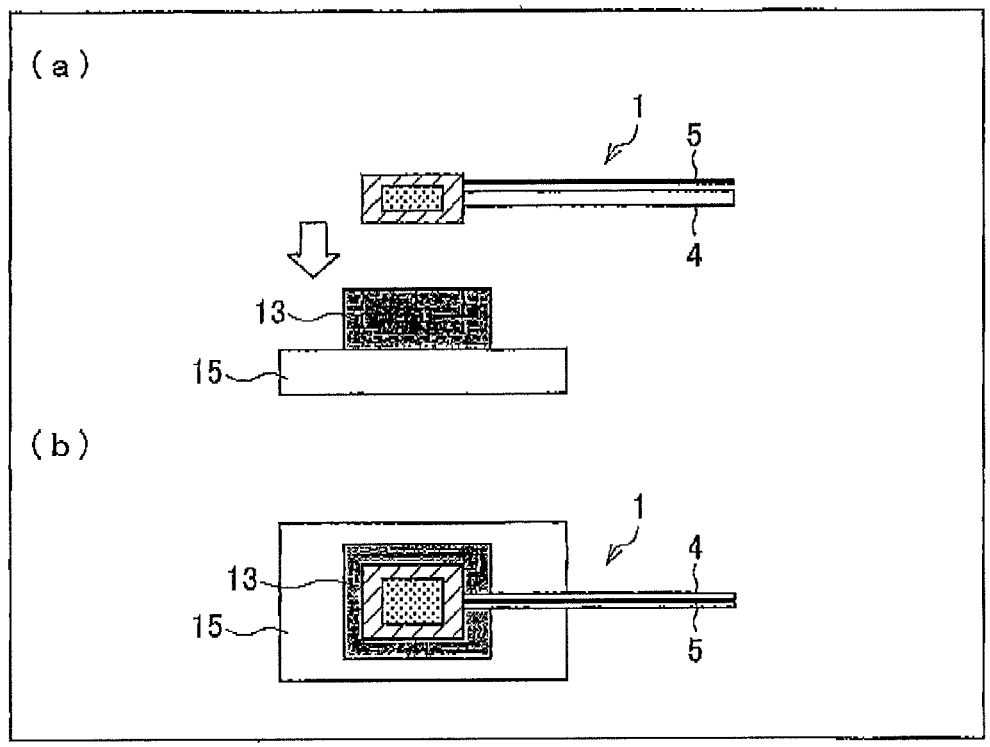
FIG. 22 is a view showing a case where the light transmission path and the electrical transmission path of the light transmission module are wired in parallel such that the distance with respect to the upper surface of the external wiring substrate is greater for one than the other, and connection is carried out by the perpendicular connection method, where
Figure 23:
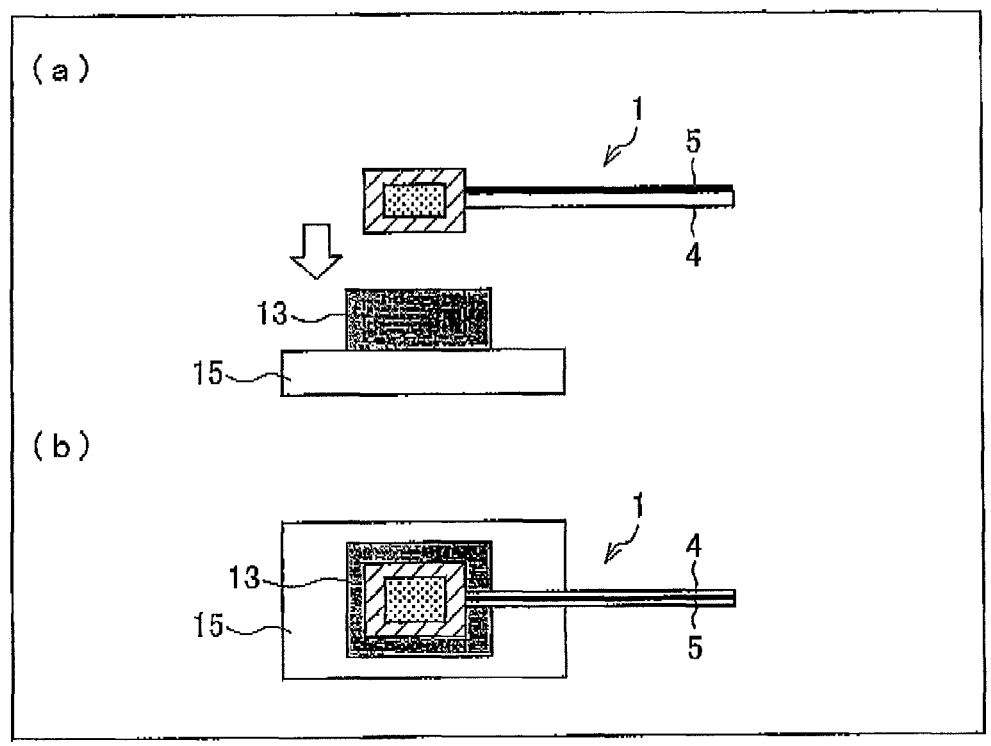
FIG. 23 is a view showing a case where the two transmission paths of the light transmission module are integrally wired, and connection is carried out by the perpendicular connection method, where
Figure 24:
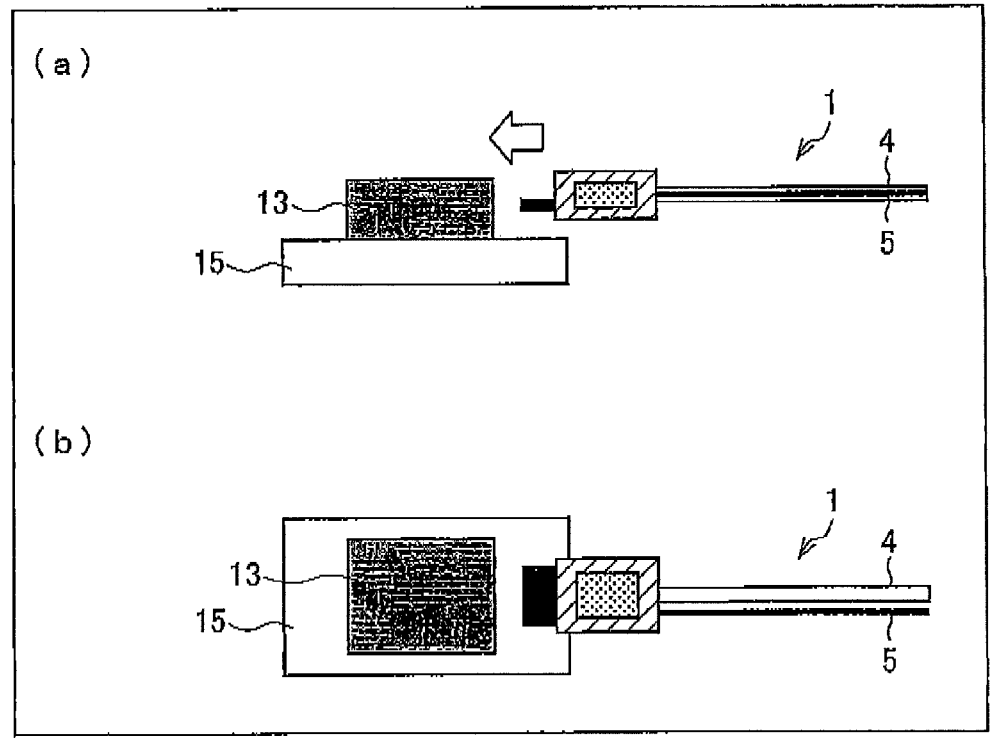
FIG. 24 is a view showing a case where the two transmission paths of the light transmission module are wired in parallel such that an equal distance is obtained with respect to the upper surface of the external wiring substrate, and connection is carried out by the horizontal connection method, where
Figure 25:
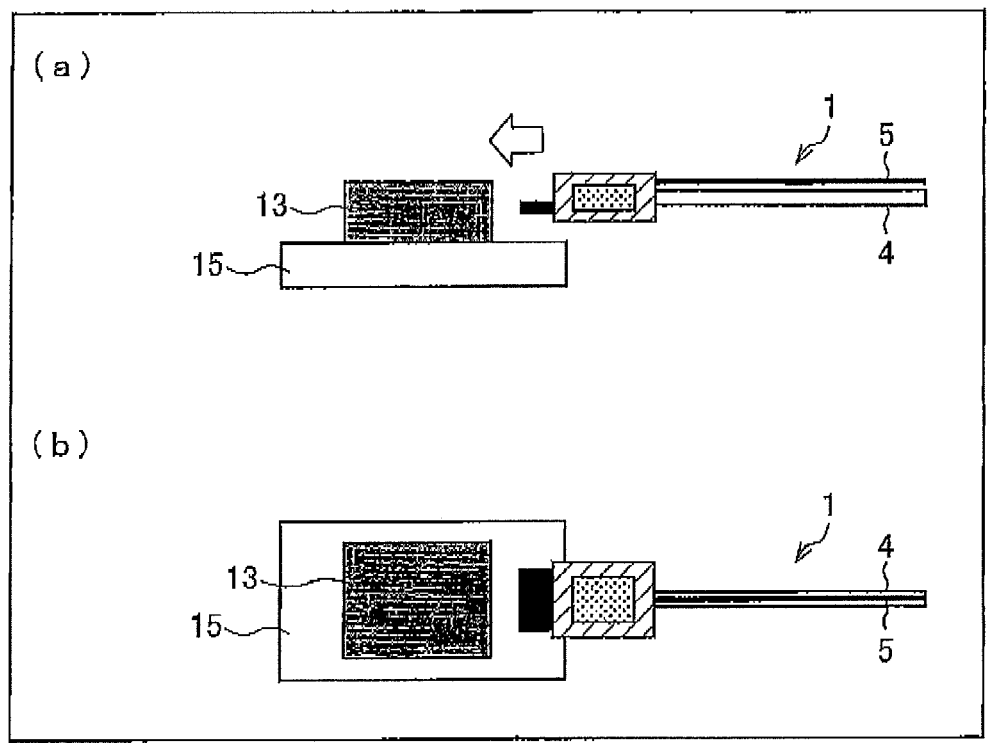
FIG. 25 is a view showing a case where the two transmission paths of the light transmission module are wired in parallel such that the distance with respect to the upper surface of the external wiring substrate is greater for one than the other, and connection is carried out by the horizontal connection method, where

FIG. 21 is a view showing a case where the light transmission path and the electrical transmission path of the light transmission module 1 are wired in parallel such that an equal distance is obtained with respect to the upper surface of the external wiring substrate 15, and connection is carried out by the perpendicular connection method, where FIG. 21(*a*) is a side cross-sectional view of the light transmission module and the external wiring substrate 15, and FIG. 21(*b*) is a plan view. FIG. 22 is a view showing a case where the light transmission path and the electrical transmission path of the light transmission module 1 are wired in parallel such that the distance with respect to the upper surface of the external wiring substrate 15 is greater for one than the other, and connection is carried out by the perpendicular connection method, where FIG. 22(*a*) is a side cross-sectional view of the light transmission module and the external wiring substrate 15, and FIG. 22(*b*) is a plan view. FIG. 23 is a view showing a case where the light transmission path and the electrical transmission path of the light transmission module 1 are integrally wired, and connection is carried out by the perpendicular connection method, where FIG. 23(*a*) is a side cross-sectional view of the light transmission module and the external wiring substrate 15, and FIG. 23(*b*) is a plan view. FIG. 24 is a view showing a case where the light transmission path and the electrical transmission path of the light transmission module 1 are wired in parallel such that an equal distance is obtained with respect to the upper surface of the external wiring substrate 15, and connection is carried out by the horizontal connection method, where FIG. 24(*a*) is a side cross-sectional view of the light transmission module and the external wiring substrate 15, and FIG. 24(*b*) is a plan view. FIG. 25 is a view showing a case where the light transmission path and the electrical transmission path of the light transmission module 1 are wired in parallel such that the distance with respect to the upper surface of the external wiring substrate 15 is greater for one than the other, and connection is carried out by the horizontal connection method, where FIG. 25(a) is a side cross-sectional view of the light transmission module and the external wiring substrate 15, and FIG. 25(b) is a plan view. FIG. 26 is a view showing a case where the light transmission path and the electrical transmission path of the light transmission module 1 are integrally wired, and connection is carried out by the horizontal connection method, where FIG. 26(a) is a side cross-sectional view of the light transmission module and the external wiring substrate 15, and FIG. 26(b) is a plan view.

In other words, as shown in FIGS. 21(a), 21(b) and FIGS. 24(a), 24(b), each of the light transmission path 4 and the electrical wiring 5 is wired in parallel such that the distance to the upper surface of the external wiring substrate 15 becomes equal in the light transmission module 1. The wiring of the light transmission paths 4α, 4b in parallel such that the distance to the upper surface of the external wiring substrate 15 is equal is referred to as parallel wiring.

As shown in FIGS. 22(a), 22(b) and FIGS. 25(a), 25(b), each of the light transmission path 4 and the electrical transmission path 5 can be wired in parallel such that the distance to the upper surface of the external wiring substrate 15 is greater for one than the other in the light transmission module 1. The wiring of the light transmission path 4 and the electrical transmission path 5 in parallel while differing the distance to the upper surface of the external wiring substrate 15 is referred to as two-story wiring.

Whether to wire the light transmission path 4 and the electrical wiring 5 by parallel wiring or by two-story wiring is appropriately selected by the restriction defined by the shape and the like of the device for mounting the light transmission module 1.

As shown in FIGS. 23(a), 23(b) and FIGS. 26(a), 26(b), the light transmission path 4 and the electrical transmission path 5 may be integrally wired in the light transmission module 1.

Figure 28:
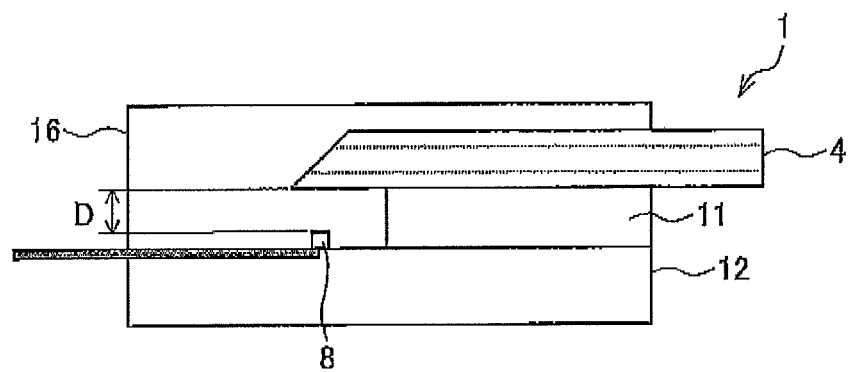
FIG. 28 is a side view showing a configuration in which the light transmission path, the height compensation member, the light emitting and receiving element portion, and the light transmission processing unit or the light reception processing unit are fixed by package at the upper surface of the substrate in the light transmission module.

As shown in FIG. 28, the light transmission processing unit 2, 52 and the light reception processing unit 3, 53 of the light transmission module 1 may be fixed in a package 16 with the light transmission path 4 and the height compensation member 11 at the upper surface of the substrate 12 of the light transmission processing unit 2, 52. The light emitting and receiving element portion 8 and the light transmission processing unit 2, 52, and the light reception processing unit 3, 53 thus can be protected from the outside, whereby degradation of the transmission properties of the electrical signal can be prevented. The light coupling efficiency can further be enhanced since a distance D between the light transmission path 4 and the light emitting and receiving element portion 8 can be reliably fixed. FIG. 28 is a side view showing a configuration in which the light transmission path 4, the height compensation member 11, the light emitting and receiving element portion 8, and the light transmission processing unit 2 or the light reception processing unit 3 are fixed by package at the upper surface of the substrate in the light transmission module 1.

Figure 29:
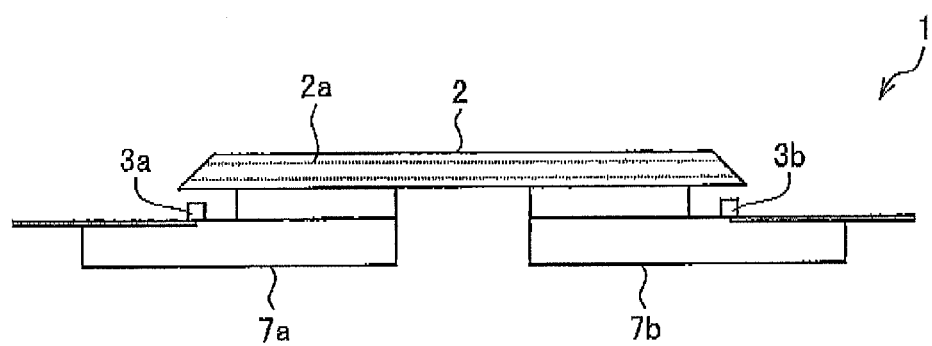
FIG. 29 is a side view showing a configuration in which a light emitting element that light-couples with one end face of the film light guide in the optical cable module and the light receiving element that light-couples with the other end face are respectively arranged on the substrate.
Figure 30:
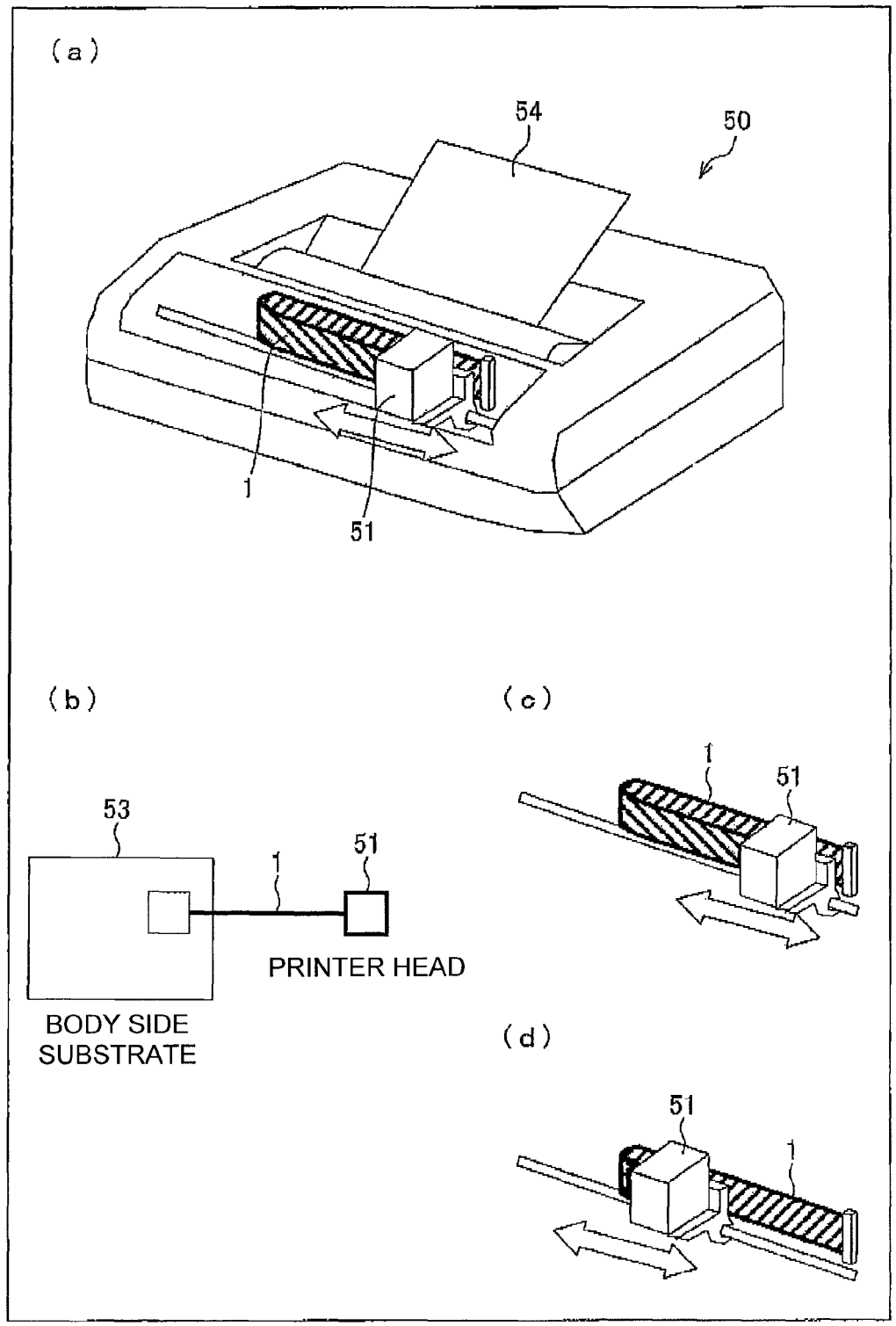
FIGS. 30(a), 30(b), and 30(c) are views showing an example in which the light transmission module according to the present embodiment is applied to a printing device.

As shown in FIG. 29, the light transmission module 1 according to the present embodiment has a configuration in which the light emitting portion 23 that light-couples with one end face of the light transmission path 4 and the light receiving portion 31 that light-couples with the other end face are arranged on substrates 12a, 12b, respectively. A light transmission module for light communication having high light coupling efficiency thus can be realized.

In the light transmission module 1, each unit of the light transmission processing unit 2, 52 excluding the light emitting portion 23 and the light reception processing unit 3, 53 excluding the light receiving portion 31 can be configured as an integrated circuit. In other words, in the light transmission module 1, each unit of the light transmission processing unit 2, 52 and the light reception processing unit 3, 53 can be miniaturized and integrated. Furthermore, in the light transmission module 1 in the portable telephone 40, the light transmission processing unit 2, 52 and the light transmission processing unit 3, 53 described above are arranged on the IC mounted in the device substrate. Since the light transmission module with lesser noise generation can be arranged on the IC, the influence of noise in the portable telephone 40 can be reduced.

Application Example

The light transmission module of the present embodiment can be applied to the following application examples. In the embodiment described above, an example of application to the portable telephone 40 has been described for the application example, but this is not the sole case, and application can be made to a hinge and the like of a foldable electronic device such as a foldable PHS (Personal Handyphone System), a foldable PDA (Personal Digital Assistant), a foldable notebook computer and the like.

A high speed and large capacity communication can be realized in a limited space by applying the light transmission module 1 to such foldable electronic devices. Therefore, it is particularly suitable in devices where high speed and large capacity data communication is necessary and miniaturization is demanded such as the foldable liquid crystal display.

As a further application example, the light transmission module 1 can be applied to a device including a drive portion such as such as a printer head in a printing device (electronic device) and a reading unit in a hard disc recording and reproducing device.

FIGS. 30(a) to 30(c) show an example in which the light transmission module 1 is applied to a printing device 50. FIG. 30(a) is a perspective view showing an outer appearance of the printing device 50. As shown in the figure, the printing device 50 includes a printer head 51 for performing printing on a paper 54 while moving in a width direction of a paper 54, where one end of the light transmission module 1 is connected to the printer head 51.

FIG. 30(b) is a block diagram of a portion where the light transmission module 1 is applied in the printing device 50. As shown in the figure, one end of the light transmission module 1 is connected to the printer head 51, and the other end is connected to a body side substrate in the printing device 50. The body side substrate includes a control means etc. for controlling the operation of each unit of the printing device 50, and the like.

FIG. 30(c) and FIG. 30(d) are perspective views showing a curved state of the light transmission path 4 when the printer head 51 is moved (driven) in the printing device 50. As shown in the figure, when the light transmission path 4 is applied to the drive portion such as the printer head 51, the curved state of the light transmission path 4 changes by the drive of the printer head 51 and each position of the light transmission path 4 is repeatedly curved.

Therefore, the light transmission module 1 according to the present embodiment are suited for such drive portion. High speed and large capacity communication using the drive portion can be realized by applying the light transmission module 1 to such drive portions.

Figure 31:
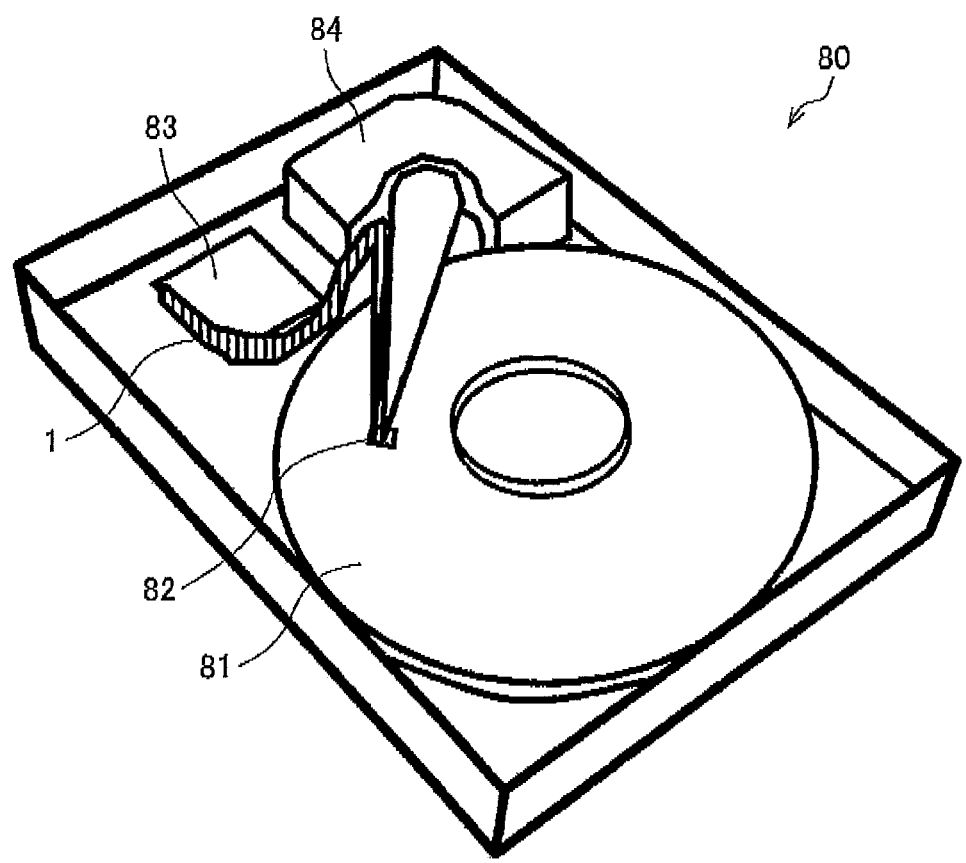
FIG. 31 shows an example in which the light transmission module according to the present embodiment is applied to a hard disc recording and reproducing device.

FIG. 31 shows an example in which the light transmission module 1 is applied to a hard disc recording and reproducing device 60.

As shown in the figure, the hard disc recording and reproducing device 60 includes a disc (hard disc) 61, a head (read/write head) 62, a substrate introducing portion 63, a drive portion (drive motor) 64, and the light transmission module 1.

The drive portion 64 drives the head 62 along a radial direction of the disc 61. The head 62 reads the information recorded on the disc 61 and writes information to the disc 61. The head 62 is connected to the substrate introducing portion 63 by way of the light transmission module 1, and propagates the information read from the disc 61 to the substrate introducing portion 63 as an optical signal and receives the optical signal of the information to write to the disc 61 propagated from the substrate introducing portion 63.

Therefore, high speed and large capacity communication can be realized by applying the light transmission module 1 to the drive portion such as the head 62 in the hard disc recording and reproducing device 60.

The present invention is not limited to the above-described embodiments, and various modifications may be made within the scope of the Claims. In other words, the embodiments obtained by combining the technical means appropriately modified within the scope of the Claims are encompassed in the technical scope of the present invention.

A light transmission module according to the present invention includes an optical converter for converting an electrical signal to an optical signal, a light transmission path for transmitting the optical signal converted by the optical converter, and an input electrical signal having a predetermined frequency being converted to an optical signal and transmitted in the light transmission path; the light transmission module including: a control instructing unit for instructing stop of drive to the optical converter when input of an electrical signal other than the predetermined frequency is detected.

Therefore, the light transmission module according to the present invention has an effect of being able to light-transmit only the appropriate data with a simple and small circuit configuration.

Further, in the light transmission module of the present invention according to the above configuration, the control instructing unit instructs stop of the drive to the optical converter while the input of the electrical signal other than the predetermined frequency is detected, and instructs the start of the drive to the optical converter when the input of the electrical signal other than the predetermined frequency is not detected.

According to the above configuration, the control instructing unit can instruct the start of drive to the optical converter when the detection with respect to the input of the electrical signal of other than the predetermined frequency is not present, and thus the drive of the optical converter can be started at an appropriate timing. Therefore, the light transmission module according to the present invention can appropriately control the drive of the optical converter.

Further, in the light transmission module of the present invention according to the above configuration, the predetermined frequency is a frequency higher than a reference frequency that becomes a reference set in advance; and the control instructing unit determines whether or not the frequency of the input electrical signal is higher than the reference frequency, and instructs the stop of the drive to the optical converter assuming the input of the electrical signal other than the predetermined frequency is detected when the frequency of the electrical signal is smaller than or equal to the reference frequency.

The reference frequency is a value of frequency set in advance to distinguish whether or not the electrical signal desired to be converted to an optical signal. For instance, such reference frequency can be set with whether or not there is a possibility the signal may become blunt unless transmitted by light transmission as a reference.

According to the above configuration, the control instructing unit determines whether or not the frequency of the input electrical signal is higher than the reference frequency, and instructs the stop of drive to the optical converter when smaller than or equal to the reference frequency. Thus, the electrical signal is not converted to an optical signal if the frequency of the input electrical signal is smaller than or equal to the reference frequency.

The drive of the optical converter can be stopped if the input electrical signal is a signal that does not need to be transmitted as an optical signal, and thus the power amount consumed by the drive of the optical converter can be reduced and only the electrical signal desired to be transmitted at high speed can be appropriately converted to an optical signal and transmitted.

Further, in the light transmission module of the present invention according to the above configuration, the control instructing unit instructs the stop of the drive to the optical converter assuming the input of the electrical signal other than the predetermined frequency is detected while the frequency of the input electrical signal is smaller than or equal to the reference frequency, and instructs the start of the drive to the optical converter assuming the input of the electrical signal other than the predetermined frequency is not detected when the frequency of the input electrical signal is higher than the reference frequency.

According to the above configuration, the control instructing unit can instruct the start of drive to the optical converter when the frequency of the input electrical signal becomes a frequency higher than the reference frequency, that is, when the detection with respect to the input of the electrical signal of other than the predetermined frequency is not present. Thus, the light transmission module according to the present invention can start the drive of the optical converter at an appropriate timing. Therefore, the light transmission module according to the present invention can appropriately control the drive of the optical converter.

Further, in the light transmission module of the present invention according to the above configuration, an amplitude of an electrical signal that becomes the predetermined frequency is an amplitude smaller than a reference amplitude that becomes a reference set in advance; and the control instructing unit determines whether or not the amplitude of the input electrical signal is smaller than the reference amplitude, and instructs the stop of the drive to the optical converter assuming the input of the electrical signal other than the predetermined frequency is detected when the amplitude of the electrical signal is greater than or equal to the reference amplitude.

The reference amplitude is a value of amplitude set in advance to distinguish whether or not the electrical signal desired to be converted to an optical signal.

According to the above configuration, the control instructing unit can determine whether or not the amplitude of the input electrical signal is smaller than the reference amplitude. That is, whether or not the input electrical signal is a predetermined frequency can be determined by the difference in magnitude of the amplitude. The stop of drive can be instructed to the optical converter when greater than or equal to the reference amplitude. Thus, the electrical signal is not converted to an optical signal when the amplitude of the input electrical signal is greater than or equal to the reference amplitude, that is, the frequency is smaller than or equal to the reference frequency.

Therefore, the drive of the optical converter can be stopped if the input electrical signal is a signal that does not need to be transmitted as an optical signal, and thus the power amount consumed by the drive of the optical converter can be reduced and only the electrical signal desired to be transmitted at high speed can be appropriately converted to an optical signal and transmitted.

Further, in the light transmission module of the present invention according to the above configuration, the control instructing unit instructs the stop of the drive to the optical converter assuming the input of the electrical signal other than the predetermined frequency is detected while the amplitude of the input electrical signal is greater than or equal to the reference amplitude, and instructs the start of the drive to the optical converter assuming the input of the electrical signal other than the predetermined frequency is not detected when the amplitude of the input electrical signal is smaller than the reference amplitude.

According to the above configuration, the control instructing unit can instruct the start of drive to the optical converter when the amplitude of the input electrical signal becomes smaller than the reference amplitude, that is, when the detection with respect to the input of the electrical signal of other than the predetermined frequency is not present. Thus, the light transmission module according to the present invention can start the drive of the optical converter at an appropriate timing. Therefore, the light transmission module according to the present invention can appropriately control the drive of the optical converter.

Further, in the light transmission module of the present invention according to the above configuration, the electrical signal of the predetermined frequency is transmitted as a differential signal, and the electrical signal other than the predetermined frequency is transmitted as a single end signal; and the control instructing unit determines whether the input electrical signal is a differential signal or a single end signal, and instructs the stop of the drive to the optical converter assuming the input of the electrical signal other than the predetermined frequency is detected when the electrical signal is the single end signal.

The single end signal refers to a signal transmitted by a method of transferring the data with one signal line in the light transmission module. The differential signal refers to a signal transmitted by a method of transferring the data with two signal lines of "positive (+)" and "negative (−)".

The drive of the optical converter can be stopped if the input electrical signal is a signal that does not need to be transmitted as an optical signal, and thus the power amount consumed by the drive of the optical converter can be reduced and only the electrical signal desired to be transmitted at high speed can be appropriately converted to an optical signal and transmitted.

Further, in the light transmission module of the present invention according to the above configuration, the control instructing unit instructs the stop of the drive to the optical converter assuming the input of the electrical signal other than the predetermined frequency is detected while the input electrical signal is the single end signal, and instructs the start of the drive to the optical converter assuming the input of the electrical signal other than the predetermined frequency is not detected when the input electrical signal is the differential signal.

According to the above configuration, the control instructing unit can instruct the start of drive to the optical converter when the input electrical signal is a differential signal, that is, when the detection with respect to the input of the electrical signal of other than the predetermined frequency is not present. Thus, the light transmission module according to the present invention can start the drive of the optical converter at an appropriate timing. Therefore, the light transmission module according to the present invention can appropriately control the drive of the optical converter.

The light transmission module of the present invention according to the above configuration further includes: an input transmission path for transmitting an input electrical signal; an electrical transmission path for transmitting an electrical signal other than a predetermined frequency; a branched portion for branching the electrical signal transmitted through the input transmission path to a path directed to the light transmission path and a path directed to the electrical transmission path; and a frequency selecting portion for passing the electrical signal other than the predetermined frequency; wherein the frequency selecting portion is arranged to be closer to the branched portion side than the control instructing unit on the electrical transmission path; and the control instructing unit determines presence of an electrical signal input from the frequency selecting portion, and instructs the stop of the drive to the optical converter assuming the input of the electrical signal other than the predetermined frequency is detected when determined that the input of the electrical signal is present.

Further, in the light transmission module of the present invention according to the above configuration, the predetermined frequency is a frequency higher than a frequency of an electrical signal that is not converted to an optical signal; and the frequency selecting portion is a filter circuit for passing an electrical signal of a frequency smaller than the predetermined frequency.

According to the above configuration, the frequency selecting portion and the control instructing unit are arranged in order from the branched portion on the electrical transmission path.

Thus, when the electrical signal other than the predetermined frequency is branched by the branched portion and respectively input to the electrical transmission path and the light transmission path, the electrical signal is passed through the frequency selecting portion and then input to the control instructing unit. When the control instructing unit receives the input of the electrical signal, that is when receiving the electrical signal other than the predetermined frequency, the control instructing unit can stop the drive of the optical converter on the light transmission path. That is, in the case of the electrical signal passing through the frequency selecting portion, such electrical signal is an electrical signal other than the predetermined frequency, and such electrical signal is inhibited from being light-transmitted.

If the input electrical signal is an electrical signal of a predetermined frequency and does not pass the frequency selecting portion, that is, if the electrical signal to be light-transmitted is input, the control instructing unit does not instruct the stop of the drive, and thus the electrical signal can be light-transmitted.

In the light transmission module according to the present invention, the electrical signal is input to the control instructing unit only in the case of the electrical signal other than the predetermined frequency by the frequency selecting portion, and thus the control instructing unit can be configured by a logical circuit that performs a simple determination on the presence of the input of the electrical signal.

In particular, when configured to transmit the electrical signal of high frequency as the optical signal, a configuration of transmitting the electrical signal of high frequency selected by the high-pass filter as the optical signal is considered, but the present application provides a circuit configuration simpler and smaller than such configuration. That is, in place of the high-pass filter with large circuit configuration, a configuration including a low-pass filter for passing the electrical signal of low frequency and the logical circuit may be adopted.

Therefore, the light transmission module according to the present invention can light-transmit only the appropriate data with a simple and small circuit configuration.

Further, in the light transmission module of the present invention according to the above configuration, an amplitude of the electrical signal other than the predetermined frequency is an amplitude smaller than a reference amplitude that becomes a reference set in advance; the light transmission module includes, an input transmission path for transmitting an input electrical signal; an electrical transmission path for transmitting the electrical signal other than the predetermined frequency; a branched portion for branching the electrical signal transmitted through the input transmission path to a path directed to the light transmission path and a path directed to the electrical transmission path; and a frequency selecting portion for passing the electrical signal having an amplitude of greater than or equal to the reference amplitude; wherein the frequency selecting portion is arranged to be closer to the branched portion side than the control instructing unit on the electrical transmission path; and the control instructing unit determines presence of an electrical signal input from the frequency selecting portion, and instructs the stop of the drive to the optical converter assuming the input of the electrical signal other than the predetermined frequency is detected when determined that the input of the electrical signal is present.

According to the above configuration, the frequency selecting portion and the control instructing unit are arranged in order from the branched portion on the electrical transmission path. Thus, when the electrical signal of greater than or equal to a reference amplitude, that is, the electrical signal other than the predetermined frequency is branched by the branched portion and respectively input to the electrical transmission path and the light transmission path, the electrical signal is passed through the frequency selecting portion and then input to the control instructing unit.

When receiving the electrical signal other than the predetermined frequency, the control instructing unit can stop the drive of the optical converter on the light transmission path. That is, in the case of the electrical signal passing through the frequency selecting portion, such electrical signal is an electrical signal other than the predetermined frequency, and such electrical signal is inhibited from being light-transmitted.

If the input electrical signal is an electrical signal smaller than the reference amplitude, that is, an electrical signal of a predetermined frequency and does not pass the frequency selecting portion, the control instructing unit does not instruct the stop of the drive, and thus the electrical signal can be light-transmitted.

In the light transmission module according to the present invention, only the electrical signal other than the predetermined frequency by the frequency selecting portion is input to the control instructing unit, and thus the control instructing unit can be configured by a logical circuit that performs a simple determination on the presence of the input of the electrical signal.

When configured to transmit the electrical signal of high frequency as the optical signal, a configuration of transmitting the electrical signal of high frequency selected by the high-pass filter as the optical signal is considered, but the circuit configuration of the high-pass filter is large and consumes great amount of power.

The present application, on the other hand, has a circuit configuration smaller than the configuration using the high-pass filter and can reduce the power consumption. That is, in place of the high-pass filter with large circuit configuration, a configuration including a low-pass filter for passing the electrical signal of greater than or equal to a reference amplitude and the logical circuit may be adopted.

Further, in the light transmission module of the present invention according to the above configuration, the control instructing unit instructs the stop of the drive to the optical converter assuming the input of the electrical signal other than the predetermined frequency is detected while the input of the electrical signal is present, and instructs the start of the drive to the optical converter assuming the input of the electrical signal other than the predetermined frequency is not detected when the input of the electrical signal is not present.

According to the above configuration, the control instructing unit can instruct the start of the drive to the optical converter when the detection on the input of the electrical signal other than the predetermined frequency is not present. Thus, the light transmission module according to the present invention can start the drive of the optical converter at an appropriate timing. Therefore, the light transmission module according to the present invention can appropriately control the drive of the optical converter.

The light transmission module of the present invention according to the above configuration, further includes: an output transmission path for outputting a signal transmitted through the light transmission path or a signal transmitted through the electrical transmission path; and a coupling portion for coupling the light transmission path and the electrical transmission path to the output transmission path.

According to the above configuration, the electrical signal input through the input transmission path can be output to the output transmission path through either the light transmission path or the electrical transmission path depending on the frequency since the output transmission path and the coupling portion are arranged.

Further, in the light transmission module of the present invention according to the above configuration, the electrical transmission path includes a first high input impedance circuit at a connecting portion with the branched portion and closer to the branched portion side than the frequency selecting portion so that the light transmission path is segmentalized from the electrical transmission path by high impedance.

According to the above configuration, the electrical transmission path includes a first high input impedance circuit at the connecting portion with the branched portion and closer to the branched portion side than the frequency selecting portion, and thus can stably transmit the optical signal without being influenced by the impedance state of the electrical transmission path.

The connecting portion with the branched portion is a range indicating the vicinity of the branched portion in the electrical transmission path, and excludes the branched portion itself.

Further, in the light transmission module of the present invention according to the above configuration, the electrical transmission path includes a second high input impedance circuit at the connecting portion with the coupling portion so that the light transmission path is segmentalized from the electrical transmission path by high impedance.

According to the above configuration, the electrical transmission path includes a second high input impedance circuit at a connecting portion with the coupling portion, and thus the output side of the light transmission path can stably transmit the optical signal without being influenced by the impedance state of the electrical transmission path.

The connecting portion with the coupling portion is a range indicating the vicinity of the coupling portion in the electrical transmission path, and excludes the coupling portion itself.

Further, in the light transmission module of the present invention according to the above configuration, the electrical transmission path includes, a first electrical transmission path for transmitting an electrical signal from the branched portion towards the control instructing unit in order of the first high input impedance circuit and the frequency selecting portion, a second electrical transmission path for transmitting the electrical signal in an opposite direction from the first electrical transmission path and connecting the branched portion and the control instructing unit, the second electrical transmission path including a third high input impedance circuit for transmitting only the electrical signal in the opposite direction from the electrical signal transmitted in the first electrical transmission path, and enabling the light transmission path to be segmentalized from the second electrical transmission path by high impedance, a third electrical transmission path for transmitting the electrical signal from the control instructing unit towards the coupling portion through the second high input impedance circuit, and a fourth electrical transmission path for transmitting the electrical signal in an opposite direction from the third electrical transmission path and connecting the control instructing unit and the coupling portion, the fourth electrical transmission path including a fourth high input impedance circuit for transmitting only the electrical signal in the opposite direction from the electrical signal transmitted in the third electrical transmission path, and enabling the light transmission path to be segmentalized from the third electrical transmission path by high impedance, and another frequency selecting portion for passing the electrical signal other than the predetermined frequency of the electrical signals output from the fourth high input impedance circuit and outputting the electric signal to the control instructing unit.

According to the above configuration, the electrical transmission path includes the first electrical transmission path including the first high input impedance circuit and the frequency selecting portion between the branched portion and the control instructing unit, and the third electrical transmission path including the second high input impedance circuit between the control instructing unit and the coupling portion.

Thus, only the electrical signal other than the predetermined frequency is transmitted from the branched portion towards the coupling portion by the first electrical transmission path and the third electrical transmission path in the electrical transmission path. Furthermore, since the first high input impedance circuit and the second high input impedance circuit are arranged on the first electrical transmission path and the third electrical transmission path, the signal transmitted in the light transmission path is prevented from being influenced.

The electrical transmission path also includes the second electrical transmission path including the third high input impedance circuit between the branched portion and the control instructing unit, and the fourth electrical transmission path including the fourth high input impedance circuit and the frequency selecting portion between the control instructing unit and the coupling portion.

Thus, only the electrical signal other than the predetermined frequency is transmitted from the coupling portion towards the branched portion by the second electrical transmission path and the fourth electrical transmission path in the electrical transmission path. Furthermore, since the third high input impedance circuit and the fourth high input impedance circuit are arranged on the second electrical transmission path and the fourth electrical transmission path, the signal transmitted in the light transmission path is prevented from being influenced.

Therefore, the light transmission module according to the present invention can realize bi-directional transmission of electrical signals such as transmitting the electrical signal other than the predetermined frequency from the branched portion towards the coupling portion and transmitting the electrical signal other than the predetermined frequency from the coupling portion towards the branched portion in the electrical transmission path.

The light transmission module of the present invention according to the above configuration further includes: a reading portion for reading information contained in the electrical signal transmitted by the electrical transmission path; and an open/close portion for opening and closing the connecting portion of the electrical transmission path and the coupling portion according to the reading result of the reading portion.

The light transmission module according to the present invention may be configured such that the reading portion is arranged on the electrical transmission path in the above-described configuration.

Further, in the light transmission module of the present invention according to the above configuration, the reading portion is arranged on the electrical transmission path.

According to the above configuration, the information contained in the electrical signal transmitted in the electrical transmission path can be grasped since the reading portion is arranged. Furthermore, the electrical transmission path can be separated from the light transmission path according to the information contained in the electrical signal since the open/close portion is arranged.

Thus, a state where the signal output from the electrical transmission path and the signal output from the light transmission path mix is prevented from occurring. Thus, stable transmission of the optical signal can be realized.

The light transmission module of the present invention according to the above configuration further includes: a light emission drive portion for driving the optical converter; a power controller for stopping power supply to the optical converter and the light emission drive portion according to an instruction to stop the drive of the optical converter from the control instructing unit; a light receiver for receiving the optical signal converted by the optical converter and converting the optical signal to an electrical signal; and an amplifier for amplifying the electrical signal converter by the light receiver; wherein the control instructing unit, the light emission drive portion, the power controller, the frequency selecting portion, and the first high input impedance circuit are formed with an integrated circuit for a first signal processing unit for executing a process of converting the electrical signal to the optical signal and outputting the optical signal to the light transmission path; and the amplifier and the second high input impedance circuit are formed with an integrated circuit for a second signal processing unit for executing a process of accepting the optical signal output from the first signal processing unit through the light transmission path and converting the optical signal to the electrical signal.

According to the above configuration, for the first signal processing circuit, the light emission drive portion, the control instructing unit, the power controller, the frequency selecting portion, and the first high input impedance circuit can be formed as an integrated circuit. For the second signal processing unit, the amplifier, and the second high input impedance circuit can be formed as an integrated circuit.

Therefore, the first signal processing unit for converting the input electrical signal to an optical signal and outputting the optical signal through the light transmission path, and the second signal processing unit for receiving the optical signal output from the first signal processing unit and converting the optical signal to the electrical signal can be miniaturized.

Further, in the light transmission module of the present invention according to the above configuration, the first signal processing unit includes each portion of the second signal processing unit and the second signal processing unit includes each portion of the first signal processing unit; and the electrical signal and the optical signal are bi-directionally transmitted between the first signal processing unit and the second signal processing unit.

Further, in the light transmission module of the present invention according to the above configuration, each portion of the first signal processing unit and the second signal processing unit is formed on a substrate; and each of the first signal processing unit and the second signal processing unit is fixed by package with the optical converter, the light receiver, and the light transmission path on the substrate.

According to such configuration, each portion of the first signal processing unit and the second signal processing unit can be protected from the outside, and thus degradation of the transmission characteristics of the electrical signal can be prevented. Furthermore, the light coupling efficiency can be enhanced since the distance between the light transmission path and the optical converter and the light receiver of the first signal processing unit and the second signal processing unit can be reliably fixed.

Further, in the light transmission module of the present invention according to the above configuration, each of the first signal processing unit and the second signal processing unit includes an electrical connecting portion for performing input and output of the electrical signal with an external substrate.

According to the above configuration, each of the first signal processing unit and the second signal processing unit has the electrical connecting portion in the light transmission module, and thus the connection with the external wiring substrate and the like is facilitated, and the light transmission module can be easily and conveniently mounted on such external wiring substrate etc.

The specific embodiments or examples described in the BEST MODE FOR CARRYING OUT THE INVENTION are merely provided to clarify the technical contents of the present invention and should not be construed in a narrow sense limited only to such specific examples, and it can be recognized that embodiments obtained by appropriately combining the technical means described in the different embodiments within the sprit of the invention and the scope of the appended Claims are also encompassed in the technical scope of the invention.

INDUSTRIAL APPLICABILITY

The light transmission module according to the present invention is applicable to the light communication path between various types of devices, and is also applicable to an optical wiring serving as an in-device wiring mounted in a small and thin commercial-off-the-shelf device.

The invention claimed is:
1. A light transmission module comprising:
an optical converter for converting an electrical signal to an optical signal;
a light transmission path for transmitting the optical signal converted by the optical converter;
an electrical transmission path for transmitting an input electrical signal;
a control instructing unit for instructing stop of drive to the optical converter based on a detection of an input electrical signal,
an input transmission path for transmitting an input electrical signal;
an electrical transmission path for transmitting an electrical signal other than a predetermined frequency;
a branched portion for branching the electrical signal transmitted through the input transmission path to a path directed to the light transmission path and a path directed to the electrical transmission path;
a frequency selecting portion for passing the electrical signal other than the predetermined frequency;
an output transmission path for outputting a signal transmitted through the light transmission path or a signal transmitted through the electrical transmission path; and
a coupling portion for coupling the light transmission path and the electrical transmission path to the output transmission path,
wherein, when an input electrical signal having a predetermined frequency is detected, the input electrical signal having the predetermined frequency is converted to an optical signal and transmitted in the light transmission path,
wherein, when input of an electrical signal other than the predetermined frequency is detected, the electrical signal other than the predetermined frequency is transmitted by the electrical transmission path without being converted to an optical signal due to the stop of the drive of the optical converter,
wherein an amplitude of an electrical signal that becomes the predetermined frequency is an amplitude smaller than a reference amplitude set in advance;
wherein the control instructing unit determines whether or not the amplitude of the input electrical signal is smaller than the reference amplitude and instructs the stop of the drive to the optical converter assuming the input of the electrical signal other than the predetermined frequency is detected when the amplitude of the electrical signal is greater than or equal to the reference amplitude;
wherein the frequency selecting portion is arranged to be closer to the branched portion side than the control instructing unit on the electrical transmission path;
wherein the control instructing unit determines presence of an electrical signal input from the frequency selecting portion, and instructs the stop of the drive to the optical converter assuming the input of the electrical signal other than the predetermined frequency is detected when determined that the input of the electrical signal is present; and
wherein the electrical transmission path includes a first high input impedance circuit at a connecting portion with the branched portion and closer to the branched portion side than the frequency selecting portion so that the light transmission path is segmentalized from the electrical transmission path by high impedance.

2. The light transmission module according to claim 1, wherein the electrical transmission path includes a second high input impedance circuit at the connecting portion with the coupling portion so that the light transmission path is segmentalized from the electrical transmission path by high impedance.

3. The light transmission module according to claim 2, wherein the electrical transmission path includes, a first electrical transmission path for transmitting an electrical signal from the branched portion towards the control instructing unit in order of the first high input impedance circuit and the frequency selecting portion, a second electrical transmission path for transmitting the electrical signal in an opposite direction from the first electrical transmission path and connecting the branched portion and the control instructing unit, the second electrical transmission path including a third high input impedance circuit for transmitting only the electrical signal in the opposite direction from the electrical signal transmitted in the first electrical transmission path, and enabling the light transmission path to be segmentalized from the second electrical transmission path by high impedance, a third electrical transmission path for transmitting the electrical signal from the control instructing unit towards the coupling portion through the second high input impedance circuit, and a fourth electrical transmission path for transmitting the electrical signal in an opposite direction from the third electrical transmission path and connecting the control instructing unit and the coupling portion, the fourth electrical transmission path including a fourth high input impedance circuit for transmitting only the electrical signal in the opposite direction from the electrical signal transmitted in the third electrical transmission path, and enabling the light transmission path to be segmentalized from the third electrical transmission path by high impedance, and another frequency selecting portion for passing the electrical signal other than the predetermined frequency of the electrical signals output from the fourth high input impedance circuit and outputting the electric signal to the control instructing unit.

4. A light transmission module comprising:

an optical converter for converting an electrical signal to an optical signal;

a light transmission path for transmitting the optical signal converted by the optical converter;

an electrical transmission path for transmitting an input electrical signal;

a control instructing unit for instructing stop of drive to the optical converter based on a detection of an input electrical signal, an input transmission path for transmitting an input electrical signal;

an electrical transmission path for transmitting an electrical signal other than a predetermined frequency;

a branched portion for branching the electrical signal transmitted through the input transmission path to a path directed to the light transmission path and a path directed to the electrical transmission path;

a frequency selecting portion for passing the electrical signal other than the predetermined frequency;

an output transmission path for outputting a signal transmitted through the light transmission path or a signal transmitted through the electrical transmission path;

a coupling portion for coupling the light transmission path and the electrical transmission path to the output transmission path;

a light emission drive portion for driving the optical converter;

a power controller for stopping power supply to the optical converter and the light emission drive portion according to an instruction to stop the drive of the optical converter from the control instructing unit;

a light receiver for receiving the optical signal converted by the optical converter and converting the optical signal to an electrical signal; and an amplifier for amplifying the electrical signal converter by the light receiver, wherein, when an input electrical signal having a predetermined frequency is detected, the input electrical signal having the predetermined frequency is converted to an optical signal and transmitted in the light transmission path, wherein, when input of an electrical signal other than the predetermined frequency is detected, the electrical signal other than the predetermined frequency is transmitted by the electrical transmission path without being converted to an optical signal due to the stop of the drive of the optical converter, wherein an amplitude of an electrical signal that becomes the predetermined frequency is an amplitude smaller than a reference amplitude set in advance;

wherein the control instructing unit determines whether or not the amplitude of the input electrical signal is smaller than the reference amplitude, and instructs the stop of the drive to the optical converter assuming the input of the electrical signal other than the predetermined frequency is detected when the amplitude of the electrical signal is greater than or equal to the reference amplitude;

wherein the frequency selecting portion is arranged to be closer to the branched portion side than the control instructing unit on the electrical transmission path;

wherein the control instructing unit determines presence of an electrical signal input from the frequency selecting portion, and instructs the stop of the drive to the optical converter assuming the input of the electrical signal other than the predetermined frequency is detected when determined that the input of the electrical signal is present; and wherein the electrical transmission path includes a first high input impedance circuit at a connecting portion with the branched portion and closer to the branched portion side than the frequency selecting portion so that the light transmission path is segmentalized from the electrical transmission path by high impedance;

wherein the electrical transmission path includes a second high input impedance circuit at the connecting portion with the coupling portion so that the light transmission path is segmentalized from the electrical transmission path by high impedance;

wherein the control instructing unit, the light emission drive portion, the power controller, the frequency selecting portion, and the first high input impedance circuit are formed with an integrated circuit for a first signal processing unit for executing a process of converting the electrical signal to the optical signal and outputting the optical signal to the light transmission path; and wherein the amplifier and the second high input impedance circuit are formed with an integrated circuit for a second signal processing unit for executing a process of accepting the optical signal output from the first signal processing unit through the light transmission path and converting the optical signal to the electrical signal.

5. The light transmission module according to claim 4, wherein the first signal processing unit includes each portion of the second signal processing unit and the second signal processing unit includes each portion of the first signal processing unit; and wherein the electrical signal and the optical signal are bi-directionally transmitted between the first signal processing unit and the second signal processing unit.

6. The light transmission module according to claim 4, wherein each portion of the first signal processing unit and the second signal processing unit is formed on a substrate; and wherein each of the first signal processing unit and the second signal processing unit is fixed by package with the optical converter, the light receiver, and the light transmission path on the substrate.

7. The light transmission module according to claim 4, wherein each of the first signal processing unit and the second signal processing unit includes an electrical connecting portion for performing input and output of the electrical signal with an external substrate.

* * * * *